US006947047B1

(12) United States Patent
Moy et al.

(10) Patent No.: US 6,947,047 B1
(45) Date of Patent: Sep. 20, 2005

(54) METHOD AND SYSTEM FOR PROGRAMMABLE PIPELINED GRAPHICS PROCESSING WITH BRANCHING INSTRUCTIONS

(75) Inventors: Simon Moy, Los Altos, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 435 days.

(21) Appl. No.: 10/166,592

(22) Filed: Jun. 10, 2002

Related U.S. Application Data

(63) Continuation-in-part of application No. 09/960,630, filed on Sep. 20, 2001.

(51) Int. Cl.[7] ............................................. G06F 15/00
(52) U.S. Cl. .................... 345/501; 345/502; 345/503; 345/504; 345/505; 345/506; 712/229
(58) Field of Search ............................... 345/501–506; 712/23, 214, 216, 219, 220, 229, 233

(56) References Cited

U.S. PATENT DOCUMENTS

| | | | | |
|---|---|---|---|---|
| 6,088,044 A | * | 7/2000 | Kwok et al. | 345/505 |
| 6,198,488 B1 | | 3/2001 | Lindholm et al. | 345/426 |
| 6,243,107 B1 | * | 6/2001 | Valtin et al. | 345/506 |
| 6,279,100 B1 | * | 8/2001 | Tremblay et al. | 712/219 |

* cited by examiner

Primary Examiner—Matthew C. Bella
Assistant Examiner—Hau Nguyen
(74) Attorney, Agent, or Firm—Moser Patterson & Sheridan LLP

(57) ABSTRACT

A programmable, pipelined graphics processor (e.g., a vertex processor) having at least two processing pipelines, a graphics processing system including such a processor, and a pipelined graphics data processing method allowing parallel processing and also handling branching instructions and preventing conflicts among pipelines. Preferably, each pipeline processes data in accordance with a program including by executing branch instructions, and the processor is operable in any one of a parallel processing mode in which at least two data values to be processed in parallel in accordance with the same program are launched simultaneously into multiple pipelines, and a serialized mode in which only one pipeline at a time receives input data values to be processed in accordance with the program (and operation of each other pipeline is frozen). During parallel processing mode operation, mode control circuitry recognizes and resolves branch instructions to be executed (before processing of data in accordance with each branch instruction starts) and causes the processor to operate in the serialized mode when (and preferably only for as long as) necessary to prevent any conflict between the pipelines due to branching. In other embodiments, the processor is operable in any one of a parallel processing mode and a limited serialized mode in which operation of each of a sequence of pipelines (or pipeline sets) pauses for a limited number of clock cycles. The processor enters the limited serialized mode in response to detecting a conflict-causing instruction that could cause a conflict between resources shared by the pipelines during parallel processing mode operation.

47 Claims, 7 Drawing Sheets

METHOD AND SYSTEM FOR PROGRAMMABLE PIPELINED GRAPHICS PROCESSING WITH BRANCHING INSTRUCTIONS

CROSS REFERENCE TO RELATED APPLICATION

The present application is a continuation-in-part of U.S. application Ser. No. 09/960,630, filed Sep. 20, 2001, and assigned to the assignee of the present application.

TECHNICAL FIELD OF THE INVENTION

The invention relates to programmable, pipelined graphics processors (e.g., pipelined vertex processors implemented as integrated circuits or portions of integrated circuits), to systems including programmable, pipelined graphics processors, and to methods for providing programmability in graphics processing pipelines.

BACKGROUND OF THE INVENTION

In three dimensional graphics, surfaces are typically rendered by assembling a plurality of polygons in a desired shape. The polygons (which are typically triangles) are defined by vertices, and each vertex is defined by three dimensional coordinates in world space, by color values, and by texture coordinates.

The surface determined by an assembly of polygons is typically intended to be viewed in perspective. To display the surface on a computer monitor, the three dimensional world space coordinates of the vertices are transformed into screen coordinates in which horizontal and vertical values (x, y) define screen position and a depth value z determines how near a vertex is to the screen and thus whether that vertex is viewed with respect to other points at the same screen coordinates. The color values define the brightness of each of red/green/blue (r, g, b) color at each vertex and thus the color (often called diffuse color) at each vertex. Texture coordinates (u, v) define texture map coordinates for each vertex on a particular texture map defined by values stored in memory.

The world space coordinates for the vertices of each polygon are processed to determine the two-dimensional coordinates at which those vertices are to appear on the two-dimensional screen space of an output display. If a triangle's vertices are known in screen space, the positions of all pixels of the triangle vary linearly along scan lines within the triangle in screen space and can thus be determined. Typically, a rasterizer uses (or a vertex processor and a rasterizer use) the three-dimensional world coordinates of the vertices of each polygon to determine the position of each pixel of each surface ("primitive" surface") bounded by one of the polygons.

The color values of each pixel of a primitive surface (sometimes referred to herein as a "primitive") vary linearly along lines through the primitive in world space. A rasterizer performs (or a rasterizer and a vertex processor perform) processes based on linear interpolation of pixel values in screen space, linear interpolation of depth and color values in world space, and perspective transformation between the two spaces to provide pixel coordinates and color values for each pixel of each primitive. The end result of this is that the rasterizer outputs a sequence red/green/blue color values (conventionally referred to as diffuse color values) for each pixel of each primitive.

One or more of the vertex processor, the rasterizer, and a texture processor compute texture coordinates for each pixel of each primitive. The texture coordinates of each pixel of a primitive vary linearly along lines through the primitive in world space. Thus, texture coordinates of a pixel at any position in the primitive can be determined in world space (from the texture coordinates of the vertices) by a process of perspective transformation, and the texture coordinates of each pixel to be displayed on the display screen can be determined. A texture processor can use the texture coordinates (of each pixel to be displayed on the display screen) to index into a corresponding texture map to determine texels (texture color values at the position defined by the texture coordinates for each pixel) to vary the diffuse color values for the pixel. Often the texture processor interpolates texels at a number of positions surrounding the texture coordinates of a pixel to determine a texture value for the pixel. The end result of this is that the texture processor generates data determining a textured version of each pixel (of each primitive) to be displayed on the display screen.

A texture map typically describes a pattern to be applied to a primitive to vary the color of each pixel of the primitive in accordance with the pattern. The texture coordinates of the vertices of the primitive fix the position of the vertices of a polygon on the texture map and thereby determine the texture detail applied to each of the other pixels of the primitive in accordance with the pattern.

FIG. 1 is a block diagram of a pipelined graphics processing system that can embody the present invention. Preferably, the FIG. 1 system is implemented as an integrated circuit (including other elements not shown in FIG. 1). Alternatively at least one portion (e.g., frame buffer 50) of the FIG. 1 system is implemented as a chip (or portion of a chip) and at least one other portion thereof (e.g., all elements of FIG. 1 other than frame buffer 50) is implemented as another chip (or portion of another chip). Vertex processor 101 of FIG. 1 generates vertex data indicative of the coordinates of the vertices of each primitive (typically a triangle) of each image to be rendered, and attributes (e.g., color values) of each vertex.

Rasterizer 201 generates pixel data in response to the vertex data from processor 101. The pixel data are indicative of the coordinates of a full set of pixels for each primitive, and attributes of each pixel (e.g., color values for each pixel and values that identify one or more textures to be blended with each set of color values). Rasterizer 201 generates packets that include the pixel data and asserts the packets to pixel shader 30. Each packet can but need not have the format to be described with reference to FIG. 3. Each packet includes the pixel data for one or more pixels and also all information that determines the state associated with each such pixel. The state information for a pixel includes a pointer to the next instruction to be executed by pixel shader 30 to accomplish the appropriate processing on the pixel, condition codes that can be used as predicates in subsequent instructions, and a set of arbitrary-use bit locations that can contain color values for pixels, iterated vertex data, texels (e.g., color data from a texture map), intermediate results from previous pixel shader instructions, or other data.

Typically, pixel shader 30 combines the pixel data in each packet received from rasterizer 201 with texture data determined by such packet. For example, a packet specifies one or more texture maps (for a pixel) and a set of texels of each texture map, and pixel shader 30 implements an algorithm to generate a texel average in response to the specified texels of each texture map (by retrieving the texels from memory 25 coupled to pixel shader 30 and computing an average of the texels of each texture map) and to generate textured pixel data by combining the pixel with each of the texel averages. In typical implementations, pixel shader 30 can perform various operations in addition to (or instead of) texturing each pixel, such as one or more of the well known operations of format conversion, input swizzle (e.g., duplicating and/or reordering an ordered set of components of a pixel), scaling and biasing, inversion (and/or one or more other logic operations), clamping, and output swizzle.

When processing each packet, pixel shader 30 updates elements of the packet (e.g., replaces color values with partially processed color values, or with fully processed color values indicative of blends of original color values and texels) but preserves the basic packet structure. Thus, when pixel shader 30 has completed all required processing operations on a packet, it has generated a modified version of the packet (an "updated" packet). In some implementations, pixel shader 30 asserts each updated packet to pixel processor 40, and pixel processor 40 performs additional processing on the updated packets while preserving the basic packet structure. Alternatively, pixel processor 40 performs the required additional processing on textured pixel data generated by pixel shader 30, but after the data have been extracted from the updated packets generated in shader 30 and without preserving packet structure. For example, an input stage of pixel processor 40 extracts textured pixel data from updated packets received from pixel shader 30, and asserts the extracted textured pixel data to other circuitry within processor 40 that performs the required processing thereon.

In variations on the system of FIG. 1, pixel processor 40 is omitted. In this case, pixel shader 30 is coupled directly to frame buffer 50, pixel shader 30 performs all required processing of the pixels generated by rasterizer 201 (by operating on packets containing the pixels to generate updated packets), and pixel shader 30 is configured to extract the fully processed pixels from the updated packets and assert the fully processed pixels to frame buffer 50.

Although pixel shader 30 is sometimes referred to herein as a "texture processor," in typical implementations it can perform various operations in addition to (or instead of) texturing each pixel, such as one or more of the conventional operations of culling, frustum clipping, polymode operations, polygon offsetting, and fragmenting. Alternatively, texture processor 30 performs all required texturing operations and pixel processor 40 performs some or all required non-texturing operations for each pixel.

Graphics application program interfaces (APIs) have been instrumental in allowing applications to be written to a standard interface and to be run on multiple platforms, i.e. operating systems. Examples of such graphics APIs include Open Graphics Library (OpenGL®) and D3D™ transform and lighting pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports the OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics APIs such as OpenGL®. By restricting the allowable operations, such commands can be highly optimized in the driver and hardware implementing the graphics API. On the other hand, a major drawback of this approach is that changes to the graphics API are difficult and slow to be implemented. It may take years for a new feature to be broadly adopted across multiple vendors.

With the impending integration of transform operations into high speed graphics chips and the higher integration levels allowed by semiconductor manufacturing, it is now possible to make at least part of the geometry pipeline accessible to the application writer. There is thus a need to exploit this trend in order to afford increased flexibility in visual effects. In particular, there is a need for a graphics processor that is compatible with modified or new graphics APIs, and also with currently established graphics APIs.

Above-referenced U.S. application Ser. No. 09/960,630, filed Sep. 20, 2001, discloses a programmable pipelined graphics processor (a vertex processor in some embodiments), computer code for programming such a processor, and methods for programmable pipelined computer graphics processing (including pipelined vertex processing). In some embodiments, the processor executes branching instructions during operation. The full text of above-referenced U.S. application Ser. No. 09/960,630 is incorporated herein by reference.

The present inventors have recognized that it would be desirable to implement a programmable graphics processor with at least two (and preferably three) processing pipelines, such that the processor can process multiple threads of graphics data in interleaved fashion in each pipeline, and such that each data thread is processed in accordance with a different program that can include branch instructions. The inventors have also recognized that it would be desirable for such a processor to be operable in a parallel processing mode in which the same program is executed in parallel on different streams of data in multiple pipelines. However, until the present invention it was not known how to implement such a processor to handle branch instructions which could cause conflicts during parallel processing mode operation, since execution of a branch instruction might require that one or more (but not all) of the pipelines take a branch. Nor was it known until the present invention how to implement such a processor to efficiently handle instructions whose execution would cause conflicts between pipelines (in use of resources shared by the pipelines) during parallel processing mode operation.

SUMMARY OF THE INVENTION

In a class of embodiments, the invention is a programmable, pipelined graphics processor (a vertex processor, in preferred embodiments) having at least two processing pipelines. Each pipeline processes data in accordance with a program, including by executing branch instructions. The processor is operable in at least one parallel processing mode in which N data values (where $N \geq 2$) to be processed in parallel in accordance with the same program are launched simultaneously into N pipelines, and in at least one fully serialized mode in which only one pipeline at a time processes data values in accordance with the program (and operation of each other pipeline is frozen). During operation in each parallel processing mode, mode control circuitry recognizes and resolves branch instructions to be executed (before processing of data in accordance with each branch instruction starts) and causes the processor to operate in a fully serialized mode when (and preferably only for as long as) necessary to prevent any conflict between the pipelines due to branching. Typically, the mode control circuitry causes the processor to operate in the fully serialized mode when it determines that a branch will be taken in at least one pipeline and that the branch will not be taken to the same target in all the pipelines. Preferably the mode control circuitry also recognizes other instructions whose execution is predicted to cause conflicts between pipelines (e.g., instructions that would require conflicting access to a shared memory during the parallel processing mode to process data in multiple pipelines) and causes the processor to enter another serialized mode (e.g., a limited serialized mode) to prevent such conflicts. When the processor operates in a fully serialized mode or limited serialized mode it has a lower throughput rate than in the parallel processing mode. Typically, the processor receives multiple threads of data values (each thread typically comprising data for a different vertex) and processes different data threads in "lock-step" in different pipelines in the parallel processing mode (so that during each clock cycle, all pipelines receive data to be processed in accordance with the same instruction but each pipeline receives data belonging to a different thread) unless and until the processor recognizes that an instruction to be executed requires that the processor enter a serialized mode.

In another class of embodiments, the invention is a programmable, pipelined graphics processor (a vertex processor, in preferred embodiments) having at least two processing pipelines. The processor is operable in at least one parallel processing mode in which N data values (where $N \geq 2$) to be processed in parallel in accordance with the same program are launched simultaneously into N pipelines, and in a "limited" serialized mode in which operation of each of a sequence of pipelines (or pipeline sets) pauses for a limited number of clock cycles. The processor enters the limited serialized mode in response to detecting a "conflict-causing" instruction (an instruction, other than a branch instruction whose branch is taken, that could cause a conflict between resources shared by the pipelines during parallel processing mode operation). An example of a conflict-causing instruction is a conditional instruction requiring reading of a constant from a constant memory (for processing data in one pipeline) but reading of a different constant from the same memory (for processing data in another one of the pipelines) in the same cycle. In one implementation, upon detecting a conflict-causing instruction when operating in a parallel processing mode, the processor enters a limited serialized mode in which one data value (to be processed in accordance with the conflict-causing instruction) is launched into a first one of the pipelines while operation of a second pipeline pauses (e.g., for one clock cycle), then operation of the first pipeline pauses (e.g., for one clock cycle) while another data value is launched (with the conflict-causing instruction) into the second pipeline. During limited serialized mode operation, when the processor has N pipelines (where N is greater than or equal to three), operation of all pipelines (except a first pipeline) halts while a data value is launched (with the conflict-causing instruction) into the first pipeline, then operation of all pipelines (except a second pipeline) halts while another data value is launched (with the conflict-causing instruction) into the second pipeline, then operation of all pipelines (except a third pipeline) halts while another data value is launched (with the conflict-causing instruction) into the third pipeline, and so on until the conflict-causing instruction and N data values have been launched into all the pipelines, at which time operation in the parallel processing mode resumes. Preferably, the processor is also configured to recognize and resolve branch instructions to be executed (before processing of data in accordance with each branch instruction starts) during parallel processing mode operation, and to trigger a fully serialized operating mode when it determines that a branch will be taken in at least one pipeline and that the branch will not be taken to the same target in all the pipelines.

In a class of preferred embodiments, the inventive processor is a vertex processor including N input buffers and M output buffers and three pipelines coupled between the input and output buffers. In one embodiment, there are nine pairs of the input buffers, and a data value is loaded into an input buffer of each pair while other data value is read from the other buffer of the pair. In another embodiment, N=9, and a data value can be loaded into each input buffer while other data value is read from the input buffer. In each embodiment, the processor can operate in a parallel processing mode to process nine threads of data as follows: data from the first, fourth, and seventh threads are launched from corresponding input buffers into the pipelines and processed in lock-step in response to instructions of a first program, then (e.g., on the next clock cycle) data from the second, fifth, and eighth threads are launched from three other input buffers into the pipelines and processed in response to instructions of a second program, and then data from the third, sixth, and ninth threads are launched from three other input buffers into the pipelines and processed in response to instructions of a third program. There is a program counter for each thread group (one comprising the first, fourth and seventh threads, another comprising the second, fifth and eighth threads, and another comprising the third, sixth and ninth threads). The operating cycle repeats until logic recognizes that one of the instructions to be executed is either a branch instruction that triggers operation in a fully serialized mode or a "conflict-causing" instruction triggering operation in a limited serialized mode. Preferably, the processor can also operate in modes in which one or two of the pipelines are disabled. Typically, the data to be processed are asserted from a vertex attribute buffer (VAB) to the input buffers, while a corresponding instruction is fetched and asserted to logic that checks whether the fetched instruction is a branch instruction or conflict-causing instruction that triggers entry into a serialized mode.

In one implementation, the input buffers and three parallel pipelines are elements of a transform engine ("TE") which converts object space vertex data into homogeneous clip space vertex data and performs other selected operations, and the processor also includes a lighting engine ("LE"). The TE's output buffers function as input buffers of the LE. The LE includes a single pipeline which receives one data value per clock cycle from the TE's output buffers, converts this homogeneous clip space vertex data into screen space vertex data, and optionally generates new colors for the screen space vertex data. Instruction fetching circuitry receives command and mode bits for each data value to be launched into the LE, and in response fetches instructions to be executed by the LE to process the data.

Another aspect of the invention is a graphics processing system including a programmable pipelined vertex processor that implements any embodiment of the invention, a rasterizer that renders vertex data output from the vertex processor, and a pixel processor that performs texturing (and optionally other processing) operations on the rasterizer's output. Optionally, a frame buffer is coupled to the output of the pixel processor. Typically, at least the vertex processor, rasterizer, and pixel processor are implemented in a single chip. The multi-pipeline architecture of the vertex processor is area-efficient in the sense that it has a smaller footprint on the chip than would a processor with a greater number of parallel pipelines. The vertex processor is also capable of higher throughput rates (for executing typical programs) than a processor having fewer parallel pipelines, and is capable of executing branch instructions.

Other aspects of the invention are a mode control unit for use in any embodiment of the inventive graphic processor, and methods for pipelined graphics data processing (in multiple pipelines) in a manner allowing parallel processing mode operation and also preventing conflicts among the pipelines and handling branching instructions.

DETAILED DESCRIPTION OF THE PREFERRED EMBODIMENTS

Figure 1:
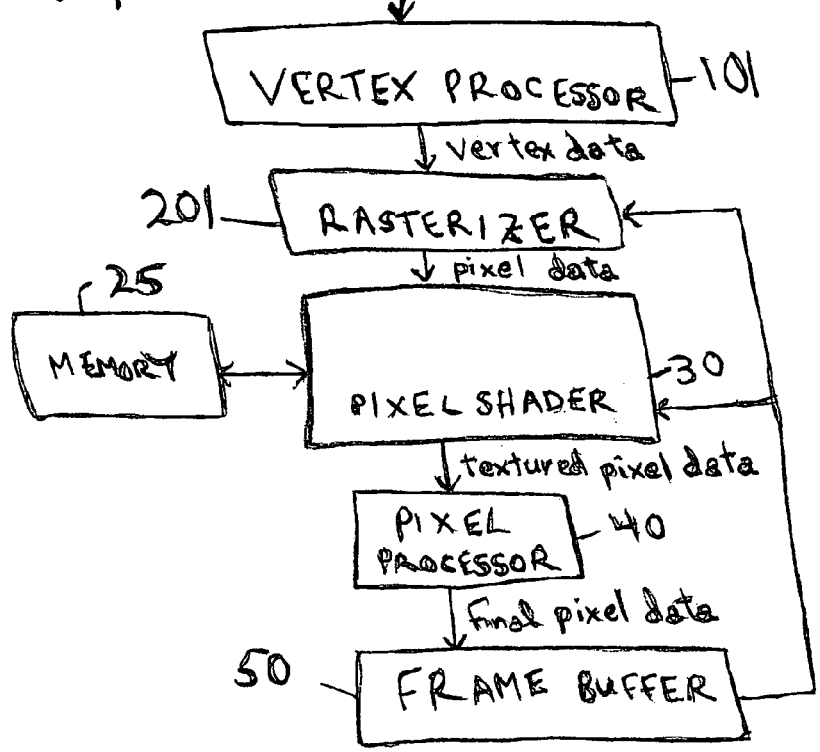
FIG. 1 is a block diagram of a pipelined graphics processor that can embody the invention.
Figure 3:
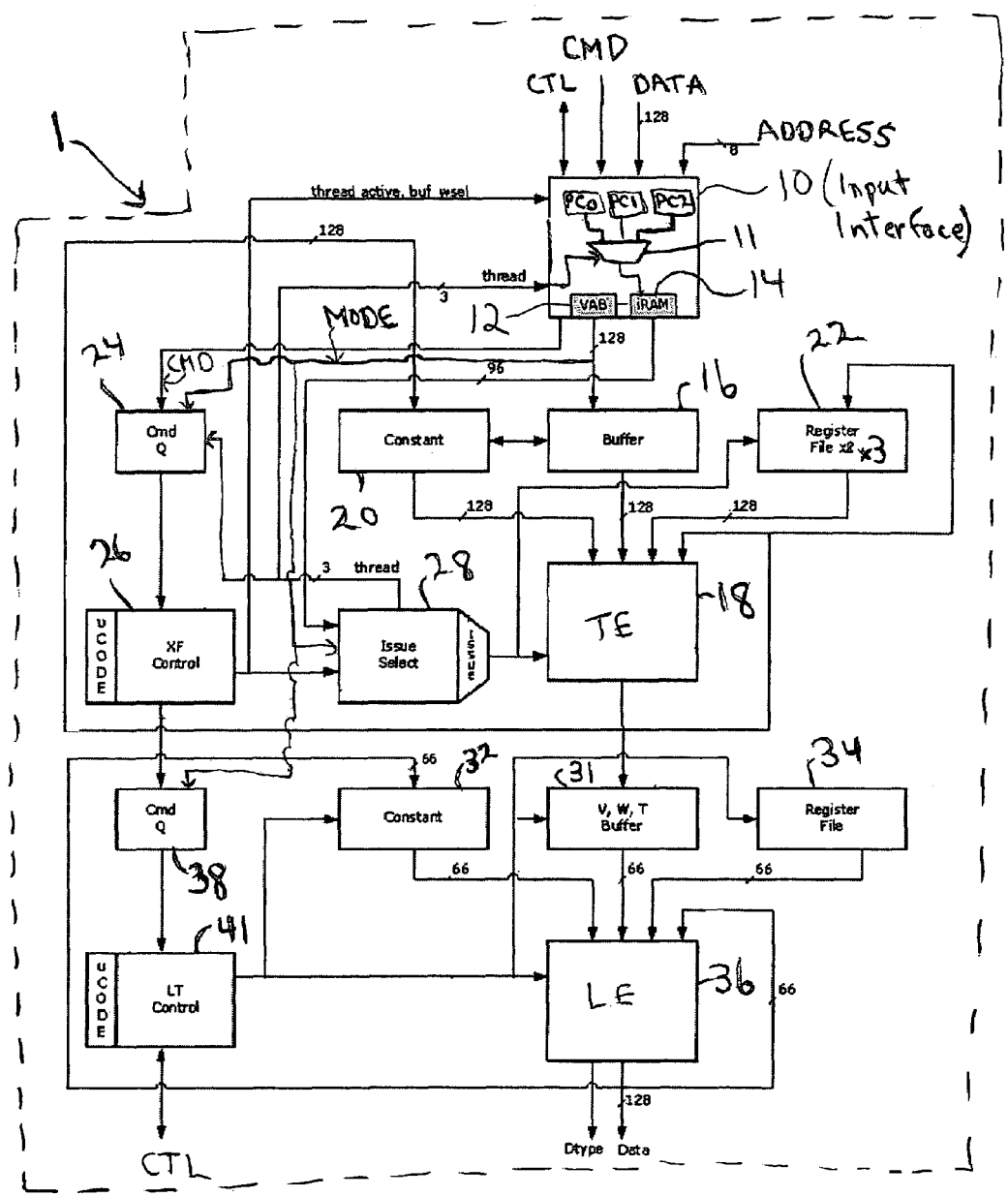
FIG. 3 is a block diagram of a vertex processor that embodies the invention.

A vertex processor that embodies the invention will be described with reference to FIG. 3. Integrated circuit 1 of FIG. 3 is a graphics processing chip which, in typical implementations, includes numerous components (not shown) in addition to those shown. The components of chip 1 that are shown in FIG. 3 comprise a vertex processor that embodies the invention. Vertex processor 101 of FIG. 1 can be implemented in accordance with the invention to have the structure of the vertex processor of FIG. 3 and to operate as does the vertex processor of FIG. 3. Alternatively, other graphics processing systems (e.g., pixel shader 30 and/or pixel processor 40 of FIG. 1) can be implemented in accordance with the invention.

Figure 2:
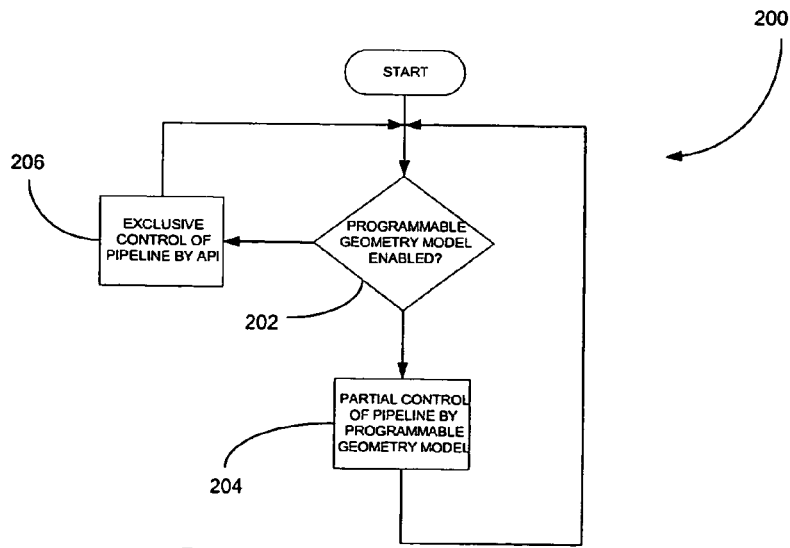
FIG. 2 is a diagram of the overall operation of an embodiment of the inventive pipelined graphics processor.

FIG. 2 illustrates high level operation 200 of a class of embodiments of the inventive pipelined graphics processor. The vertex processor of FIG. 3 can operate in the manner to be described with reference to FIG. 2. FIG. 2 assumes that the processor is operable either in a fixed mode (e.g., the "fixed function" mode of the FIG. 3 processor) in which it executes selected ones of predetermined operations on data, or in a programmable mode (e.g., the "program" mode of the FIG. 3 processor). The processor can operate in accordance with the invention in both the programmable mode and the fixed mode or in only one of such modes. It is also assumed that in the fixed mode, the processor operates with greater (or complete) compliance with a standard graphics API.

During operation, it is continuously determined (at decision 202 of FIG. 2) whether the processor should operate in the programmable mode. If so, the programmable mode is enabled (at operation 204) to supersede (at least partially) operation in compliance with the standard graphics API, thus providing increased flexibility in generating visual effects. If not, the programmable mode is disabled (at operation 206) and the processor operates in the fixed mode with greater (or complete) compliance with the standard graphics API. In some implementations, states of the standard graphics API may not be overruled by invoking the programmable mode. In some implementations, no standard graphics API state may be directly accessible when the processor operates in a programmable mode.

In some embodiments (e.g., that of FIG. 3), the inventive processor operates in accordance with the invention only in the programmable mode, and operates in the programmable mode only to perform vertex processing which converts object space vertex data into homogeneous clip space vertex data. This is to avoid compromising hardware performance that is afforded by allowing exclusive control of primitive processing by a standard graphics API at all times. In other embodiments, the inventive processor operates in accordance with the invention (typically, in a programmable mode that supersedes a standard graphics API) during primitive processing.

The inventive vertex processor of FIG. 3 includes two decoupled engines: transform engine 18 (comprising three parallel pipelines with some shared resources) and lighting engine 36 (comprising one pipeline). Transform engine ("TE") 18 operates in two major operation modes: a fixed function mode and a program mode. In the fixed function mode, it executes instructions from embedded microcode according to user-defined modes. In the program mode, it executes preloaded instructions that reside in instruction RAM 14 ("RAM" 14) within input interface 10. TE 18 comprises one primary execution pipeline ("pipe") and two auxiliary execution pipelines ("pipes"), each of the three pipes preferably having the structure shown in FIG. 7. Typically, the FIG. 3 processor operates in a mode in which the primary pipe executes all instructions (and the auxiliary pipelines are disabled), but enters a parallel processing mode (in which all three pipes are enabled) when a greater data throughput rate is required (e.g., when operation of TE 18 would otherwise become a bottleneck in operation of the FIG. 3 processor). In the parallel processing mode, three data values to be processed in parallel (in accordance with the same program) are launched simultaneously into the three pipes (with an instruction), and the three pipes function in a single-instruction-multiple-data (SIMD) scheme in which they share mode bits (from interface unit 10), instructions, and constant data (from constant memory 20). In variations on the typical implementation, the FIG. 3 processor is also operable in a parallel processing mode in which only two of the three pipes are enabled, and two data values to be processed in parallel (in accordance with the same program) are launched simultaneously into these two pipes (with an instruction) and the two pipes function in an SIMD scheme.

Lighting engine ("LE") 36 only operates in the fixed function mode (in response to instructions embedded in a memory within control unit 41). Each of LE 36 and each of the three pipelines within TE 18 can process three sequences of data values (three "data threads") in interleaved fashion, in the sense that a data value belonging to one data thread is launched into the pipeline in one clock cycle, a data value belonging to another data thread is launched into the pipeline in the next clock cycle, a data value belonging to the third data thread is launched into the pipeline in the next clock cycle, the next data value from the first data thread is launched into the pipeline in next clock cycle, and so on. In any clock cycle, TE 18 can launch (into each pipeline thereof) a data value belonging to any data thread. In contrast, LE 36 can only launch (into its pipeline) a sequence of data values from a predetermined sequence of data threads.

Major functional blocks of the FIG. 3 processor include input interface 10 (including vertex attribute buffer 12 and instruction RAM 14), TE "vertex launch control" (including buffers 16, control units 26 and 28, and command and mode bit buffer unit 24) for launching vertex data into TE 18, LE "vertex launch control" (including buffers 31, control unit 41, and command and mode bit buffer 38) for launching vertex data into LE 36, TE "instruction fetch" (control units 26 and 28 and instruction RAM 14) for fetching instructions to be executed by TE 18, LE "instruction fetch" (control unit 41) for fetching instructions to be executed by LE 36, TE instruction issue (control unit 28) for committing instructions to TE 18 and determining the mode in which TE 18 will execute the instructions, LE instruction issue (control unit 28) for committing instructions to LE 36 (and determining the mode in which TE 36 will execute the instructions), TE instruction execution (TE 18), and LE instruction issue (LE 36).

The "Data" (identified in FIG. 3) asserted to input interface 10 can include vertex attribute data, program instructions and mode bits. The vertex attribute data asserted to input interface 10 can be loaded into vertex attribute buffer ("VAB") 12. Once all new attribute loads to VAB 12 are completed, the new data can be drained from VAB 12 to the appropriate one of input buffers 16. In a typical implementation, input buffers 16 comprise eighteen input buffers grouped into nine pairs of buffers (each pair for a different one of nine data threads). Typically, each data thread comprises data values for a different vertex. Each pair of buffers 16 receives data values belonging to a different data thread. During each clock cycle, one buffer of each pair can receive a data value, and another data value (belonging to the same data thread) can be launched from the other buffer in the pair into transform engine ("TE") 18. Typically also, destination buffers 31 consist of nine pairs of buffers, each pair for a different one of the data threads. During each clock cycle, one buffer in each pair of buffers 31 can receive a transformed data value belonging to a data thread while another transformed data value (belonging to the same data thread) is launched from the other buffer in the pair into lighting engine ("LE") 36.

When a data value is launched into TE 18 from one of input buffers 16, TE 18 generates a transformed data value in response thereto and the transformed data value is loaded into a corresponding one of destination buffers 31 (and/or into one or both of register file 22 and constant memory 20 for recirculation back to the inputs of TE 18). In a parallel processing mode, three data values to be processed in parallel in TE 18 (in response to the same program instruction) are launched in the same clock cycle into the three pipes of TE 18. Typically, the processor operates in an operating cycle in which these three data values belong to a first group of data threads (e.g., a first, fourth, and seventh data thread) and are processed in lock-step in response to the same instruction, and then (on the next clock cycle), data values from a second group of data threads (e.g., second, fifth, and eighth data threads) are launched from three other ones of input buffers 16 into TE 18 and processed in response to another instruction, and then (on the next clock cycle), data from a third group of data threads (e.g., third, sixth, and ninth data threads) are launched from three other ones of buffers 16 into TE 18 and processed in response to another instruction. The sequence of data values launched into each pipeline of TE 18, and the corresponding sequence in which data are loaded into buffers 16 from VAB 12, can be determined in the manner described in above-referenced U.S. Pat. No. 6,198,488 (e.g., with reference to FIGS. 2A, 2B, and 2C). The complete disclosure of U.S. Pat. No. 6,198,488 is incorporated herein by reference.

In the fixed function mode, commands and mode bits are asserted from input interface 10 to buffer unit 24, and are asserted in a selected sequence from buffer unit 24 to control unit 26. Each set of mode bits asserted from buffer unit 24 to unit 26 (in response to an instruction thread control word from unit 28) determines the next instruction to be fetched (by unit 26) from an instruction memory within unit 26. In the program mode, each instruction thread control word from unit 28 determines which of three program counters (in input interface 10) is coupled to IRAM 14, and the program counter coupled to IRAM 14 determines the next instruction to be "fetched" from RAM 14 (the next instruction to be asserted from RAM 14 to unit 28). Unit 28 commits a sequence of the fetched instructions (and a sequence of mode bit sets that it receives with the fetched instructions) to TE 18 to determine the processing steps performed by TE 18. Each fetched instruction enters a three-slot issue window in control unit 28, the operands of each fetched instruction undergo dependency checks in control unit 28 in a manner to be described below, and each instruction is committed from the issue window to one or more of the execution pipes of TE 18 in an appropriate time slot. Each slot of the issue window corresponds to a different one of three data threads to be processed in interleaved fashion in one pipeline of TE 18. The instructions for processing a first one of the data threads are asserted to TE 18 from a first one of the slots, the instructions for processing a second one of the data threads are asserted to TE 18 from a second one of the slots, and the instructions for processing a third one of the data threads are asserted to TE 18 from a third one of the slots. In some operating modes, each instruction in each single slot of the issue window is asserted simultaneously to all three pipelines of TE 18 for processing data values from three different data threads in parallel in the pipelines. In such modes, the FIG. 3 processor can process nine different threads of data in interleaved fashion. Control unit 28 preferably includes mode control circuitry implemented to avoid conflicts between the pipelines of TE 18 and to handle branch instructions, while causing the FIG. 3 processor always to operate in a mode in which there are no stalls in any of the pipelines of TE 18 during execution of an instruction committed to TE 18 from control unit 28. Both TE 18 and LE 36 can stall at the command level only (before an instruction is committed to an execution pipe). Once an instruction is committed to an execution pipe (of TE 18 or LE 36), it is always fully executed.

For each transformed data value to be launched into LE 36 from one of buffers 31, corresponding command bits (asserted from input interface 10, and passed through buffer unit 24, unit 26, and buffer 38, to control unit 41) and mode bits from interface 10 cause control unit 41 to fetch an instruction (from instruction memory in control unit 41) and to assert the fetched instruction at an appropriate time to LE 36 for processing a data value that is launched (with the instruction) into the execution pipe of LE 36. Each processed data value generated by LE 36 (in response to a data value from one of buffers 31 and an instruction) is asserted to constant memory 32 (for recirculation back to the inputs of LE 36) and/or is output from the FIG. 3 processor (in which case it is either loaded to temporary registers and/or asserted to a rasterizer).

Data values are launched into each of TE 18 and LE 36 in a predetermined order, but they can output the resulting processed data values in a different order. Transformed vertex data values output from TE 18 are reordered into the predetermined order when launched into LE 36. Processed vertex data values output from LE 36 will typically be reordered (if necessary) by the rasterizer that receives them from the FIG. 3 processor. The FIG. 3 processor should be configured to handle unknown and illegal user instructions loaded into IRAM 14, preferably by delivering predetermined default outcomes in response thereto.

The main operations performed by the FIG. 3 processor to transform data in TE 18 are:
  i. Launch: assertion to TE 18 of both a data value (or set of data values belonging to a data thread or group of data threads) and an instruction for processing each asserted data value;
  ii. Prefetch: setting up the next instruction fetch;
  iii. Fetch: performing an instruction fetch;
  iv. Issue: performing dependency checking on a fetched instruction (and otherwise determining whether to assert the instruction into TE 18);
  v. Commit: asserting an instruction (sometimes referred to herein as "issuing" the instruction) to TE 18;
  vi. RF (register fetch): fetching operands in a stage of a pipeline of TE 18;
  vii. Execute: multi-stage pipelined execution of an instruction by TE 18; and
  viii. WB: asserting the output of TE 18 to a register (for recirculation through TE 18) or to a buffer (for launching into LE 36).

The main operations performed by the FIG. 3 processor to transform data in LE 36 are:
  i. Launch: simultaneous assertion to LE 36 of a data value and an instruction for processing the data value;
  ii. Fetch: fetching a microcode instruction to be asserted to LE 36;
  iii. Commit: asserting an instruction to LE 36;
  iv. Execute: multi-stage pipelined execution of an instruction by LE 36; and
  v. WB: asserting the output of LE 36 to a register (for recirculation to LE 36) or to a buffer (e.g., for assertion to a rasterizer).

We next describe operation of input interface 10 and VAB 12 in greater detail. In one implementation, input interface 10 receives vertex attribute data values (and mode bits and program instructions) on a 128-bit data bus, and input interface 10 also receives a 9-bit address for each data value, a 5-bit command, and several control bits on a 18-bit sideband bus. The data values, mode bits, and program instructions are written to VAB 12, or passed through VAB 12 to other circuitry. The data values are asserted from VAB 12 to appropriate ones of input buffers 16 as described above. Mode bits can be read from VAB 12 and written to a buffer within interface 10 from which they can be asserted to buffers 24 and 38 and control unit 28. Input interface 10 includes logic for determining the sequence in which data values, mode bits, and program instructions are read from VAB 12, and this logic can be implemented as described in above-referenced U.S. Pat. No. 6,198,488.

Program instructions (121-bit instructions, in a typical implementation) are written into IRAM 14 from VAB 12, in response to commands asserted to input interface 10. Input interface 10 includes three program counters (PC0, PC1, and PC2), and multiplexer 11 coupled to connect any selected one of the program counters to IRAM 14. In the program mode, multiplexer 11 responds to an "instruction thread" control word (identified as "thread" in FIG. 3) from control unit 28 to connect the appropriate one of program counters PC0, PC1, and PC2 to IRAM 14, thus causing the stored instruction determined by the relevant program counter to be read from RAM 14 and asserted to control unit 28. Thus, three programs can be executed independently (in an interleaved manner), each on data values belonging to a different data thread (or group of data threads). For example, the FIG. 3 processor can operate in an operating cycle in which three data values belonging to a first group of data threads (e.g., a first, fourth, and seventh data thread) and an instruction (determined by program counter PC0) are launched into TE 18 in a first clock cycle, and then data values from a second group of data threads (e.g., second, fifth, and eighth data threads) and an instruction determined by program counter PC 1) are launched into TE 18 during the next clock cycle, and then data from a third group of data threads (e.g., third, sixth, and ninth data threads) and an instruction determined by program counter PC2) are launched into TE 18 during the next clock cycle.

The program counters can be used in any fashion, for example, to implement jumping, incrementing, calling and returning, performing a table jump, and/or dispatching (determining a starting point of code segment execution based on a received parameter).

Typical commands (identified as "Cmd" in FIG. 3) that can be executed by input interface 10 include the following: NOP ("no operation" which can be used as a spacer between commands); Load VAB (write data to VAB 12); Load Instruction RAM (write data to IRAM 14); and Load mode bit register (write mode bits to a mode bit register within input interface 10).

In typical implementations, the data asserted to input interface 10 are written to or passed through VAB 12, and VAB 12 is configured to have a number of slots, each slot capable of storing a "quad word" comprising 128 bits. The most common type of data asserted to input interface 10 is typically vertex attribute data. In one implementation, VAB 12 has eighteen slots that are used as follows in "program mode" operation of the FIG. 3 processor: slots 0 to 15 are used exclusively for vertex attribute data such as position data, texture coordinates, and colors; slot 16 is used for passing through other data such as operation mode bits, constants, and instructions (e.g., for passing through instructions to IRAM 14); and slot 17 is used for passing through state-bundle data that are not used internally. Sixteen slots of VAB 12 can be used as follows in "fixed function mode" operation of the FIG. 3 processor: slot 0: position data; slot 1: weight data; slot 2: normal data; slot 3: diffuse color; slot 4: specular color; slot 5: fog; slot 8: texture 0; slot 9: texture 1; slot 10: texture 2; slot 11: texture 3; slot 12: texture 4; slot 13: texture 5; slot 14: texture 6; slot 15: texture 7; slot 16: non-vertex data; and slot 17: state-bundle data. In other implementations, two of these slots (or two additional slots of VAB 12, e.g., slots 6 and 7) can be used for point size and back side diffuse color during "fixed function mode" operation.

Preferably, VAB 12 can continuously accept incoming data loads while draining (e.g., to buffers 16) data previously asserted thereto. As described in above-cited U.S. Pat. No. 6,198,488, its normal draining order is preferably altered if incoming vertex attribute data belong to a slot that has not drained yet to buffers 16 for the current vertex. VAB 12 is preferably caused to drain such slot first to provide room for the new incoming attribute data to be written to the slot. In addition, VAB 12 preferably does not unnecessarily drain a particular attribute data value to one of buffers 16 if the relevant one of buffers 16 already contains the latest copy of the particular attribute data value. For some applications, it is desirable to implement input interface 10 to be operable in a mode (in response to a command from an external source) in which it passes data through directly to buffers 16, without passing the data through VAB 14.

Typically, input buffers 16 are grouped into six sets of three input buffers (each set of three being capable of launching data simultaneously into three pipelines of TE 18), and the FIG. 3 processor implements a state machine for each set of three input buffers. The logic for managing buffers 16 resides at least primarily in these state machines. As noted above, the processor can operate in a "serialized" mode in which only one pipeline (the "primary" pipeline) of TE 18 receives data values from input buffers 16. In the serialized mode, data values can be launched in interleaved fashion from a sequence of three different input buffers into the primary pipeline (i.e., data from a first buffer associated with a first state machine in a first clock cycle, data from a second buffer associated with a second state machine in the next clock cycle, data from a third buffer associated with a third state machine in the next clock cycle, and so on). Or the processor can operate in a "parallel processing" mode in which data values are launched in interleaved fashion from nine of the input buffers into three pipelines of TE 18 (i.e., data from a first set of three buffers associated with a first state machine in a first clock cycle, data from a second set of three buffers associated with a second state machine in the next clock cycle, data from a third set of three buffers associated with a third state machine in the next clock cycle, and so on). Each state machine can have the following states:

i. IDLE: the three associated buffers are ready for incoming data;
ii. VALID: the primary buffer (which feeds the "primary" pipeline) has been loaded with valid data;
iii. LOAD: at least one of the auxiliary buffers (those that feed pipelines other than the "primary" pipeline) is being loaded with new data;
iv. SINGLE: the primary buffer is ready for a "single-launch" (in which data is launched into the primary pipeline only);
V. MULTIPLE: all three buffers are ready to be launched simultaneously;
vi. SINGLE_ACTIVE: the primary buffer has been single-launched;
vii. MULTIPLE_ACTIVE: all three buffers have been launched simultaneously; and
viii. DONE: The last instruction (for processing data in any of the buffers) has been fetched.

In a variation on the described embodiment, the processor is also capable of launching data values (each to be processed in accordance with the same instruction) simultaneously into two of the three pipelines of TE 18. Preferably, the processor can execute a program in one pipeline only (with single launches into the pipeline) when operation in this mode is adequate to process the required volume of input data, or the processor can execute the same program in two pipelines with dual launches of different streams of input data into the two pipelines (e.g., to handle a greater volume of input data), or the processor can execute the same program in three pipelines with triple launches of different streams of input data into the three pipelines.

Conflict-handling logic in the FIG. 3 processor (e.g., mode control circuitry in control unit 28) allows a multiple launch of data values into two or more pipelines of TE 18 only when simultaneous execution of the corresponding instruction on all the data values (each in a different pipeline) would not cause a conflict. Otherwise, such as when the instruction requires loading of different constants to different ones of the pipelines, or generation of different constants in different ones of the pipelines (to be stored in a constant memory shared by the pipelines), the conflict-handling logic causes the processor to enter a mode in which only one data value is launched into one pipeline of TE 18 per clock cycle.

When no conflict is predicted and TE 18 operates in the parallel processing mode, data values from two or more input buffers (in unit 16) are simultaneously launched into different pipelines of TE 18 during each clock cycle, and the corresponding mode bits and instruction are launched into the pipelines. The instructions and corresponding mode bits (in the "program mode"), or the mode bits used to fetch each instruction (in the fixed function mode) are also stored temporarily as part of an "instruction thread" having a thread identification value ("thread ID"). In the program mode, the instructions and mode bits that determine each instruction thread can be copied into an instruction thread buffer in input interface 10. In the fixed function mode, the mode bits that determine each instruction thread can be stored in buffer unit 24.

When TE 18 operates in the parallel processing mode, each of multiple pipelines of TE 18 can execute the same sequence of instructions of a single instruction thread, using the mode bits corresponding to each instruction, in parallel on data values from different data threads (so that each stage of each pipeline performs a different operation, determined by a different instruction of the same instruction thread, on different data values from a single data thread during each clock cycle). More typically, however, multiple instruction threads are executed in interleaved fashion, so that successive stages of each pipeline perform different operations (determined by instructions from different instruction threads) on different data values from different data threads during each clock cycle.

Control unit 28 asserts to input interface 10 and buffer unit 24 an "instruction thread" control word (identified as "thread" in FIG. 3) for use in determining the next instruction (and mode bit set) to be fetched from IRAM 14 in the program mode, and the next mode bit set to be asserted from buffer unit 24 to unit 26 (in the fixed function mode) to cause unit 26 to fetch an instruction. Specifically, buffer unit 24 stores three sets of mode bits (each for different data thread) and at least one command, and each of three different values of the instruction thread control word causes buffer unit 24 to assert a different one of the mode bit sets to unit 26. As noted above, multiplexer 11 in input interface 10 responds to the instruction thread control word by connecting the appropriate one of program counters PC0, PC1, and PC2 to IRAM 14, thereby causing the instruction determined by the relevant program counter to be read out from IRAM 14. Each fetched instruction (from input interface 10 or unit 26) is asserted to unit 28, for processing by conflict-handling logic in unit 28 prior to being launched into TE 18.

Although branch instructions are typically allowed only in the program mode, the instruction thread control word can be used in both the fixed function mode and program mode to determine when to fetch a new instruction (and mode bit set) from interface 10, and when to assert a new mode bit set to unit 26. In each of the program mode and fixed function mode, the timing with which new instructions should be fetched depends on whether a conflict-causing instruction has been detected. In response to detection of a conflict-causing instruction, the FIG. 3 processor enters the above-mentioned "limited" serialized mode for three clock cycles (in which three data values are launched successively into the three pipelines of TE 18, each with the conflict-causing instruction, and operation of a different pair of the pipelines halts during each of the three clock cycles). In the limited serialize mode, unit 28 would assert the same instruction thread control word for three cycles. After the limited serialized mode, the processor would typically resume operation in a parallel processing mode in which the instruction thread control word has a repeating sequence of three different values (with a transition between different values once per clock cycle) to implement interleaved processing of three threads in each pipeline of TE 18.

When mode control circuitry within unit 28 identifies a branch conflict (i.e., determines that a branch will be taken in at least one pipeline of TE 18 and that the branch will not be taken to the same target in all pipelines of TE 18) during parallel processing mode operation of the FIG. 3 processor, TE 18 enters a serialized mode of operation to execute the relevant branch instruction. In a serialized mode, during each clock cycle, a data value from one of input buffers 16 is launched into one pipeline of TE 18, and the corresponding mode bits and branch instruction are launched into the pipeline and also stored temporarily as part of an "instruction thread" having a thread identification value ("thread ID") such as by being copied into an instruction thread buffer (e.g., within control unit 28). Invalidated instructions are asserted to the other pipelines (e.g., NOP instructions are asserted to the other pipelines in place of the instruction launched to the single pipeline). As TE 18 continues to operate in the serialized mode, the following sequence of operations can occur: the pipeline sequentially executes (and stores) all the instructions of one instruction thread on data values from a single data thread until all the instructions of the instruction thread have been executed (and all the instructions and mode bits of the instruction thread have been stored); then, another one of the pipelines sequentially executes all the instructions of the same instruction thread (using the stored instructions and corresponding stored mode bits) on data values from another data thread until all the instructions of the instruction thread have been executed a second time (while invalidated instructions are asserted to the other pipelines); and then, a third one of the pipelines sequentially executes all the instructions of the same instruction thread (using the stored instructions and corresponding stored mode bits) on data values from a third data thread until all the instructions of the instruction thread have been executed a third time (while invalidated instructions are asserted to the other pipelines).

However, in the typical case in which multiple instruction threads are executed in interleaved fashion in each pipeline of TE 18 during serialized mode operation (as well as during parallel processing mode operation), serialized mode operation can include the following sequence of operations: a data value from one input buffer is launched into one pipeline of TE 18 and the corresponding mode bits and instruction are launched into the pipeline and also stored temporarily as part of a first instruction thread, then (on the next clock cycle) a data value of a second data thread is launched (from a different one of input buffers 16) into the pipeline and the corresponding mode bits and instruction are launched into the pipeline and stored temporarily as part of a second instruction thread, then another data value from a third data thread is launched into the pipeline and the corresponding mode bits and instruction are launched into the pipeline and stored temporarily as part of a third instruction thread, and this cycle repeats (while invalidated instructions are asserted to the other pipelines) until the pipeline has executed all instructions of the first instruction thread on data of a first data thread, all instructions of the second instruction thread on data of a second data thread, and all instructions of the third instruction thread on data of a third data thread (and all the instructions and mode bits of each instruction thread have been stored). Then, a data value (of a fourth data thread) is launched (from another one of input buffers 16) into a second pipeline of TE 18 with a stored instruction of the first instruction thread and corresponding stored mode bits. Then (on the next clock cycle), a data value of a fifth data thread is launched (from a different input buffer) into the second pipeline with a stored instruction of the second instruction thread and corresponding stored mode bits. Then (on the next clock cycle), a data value of a sixth data thread is launched (from a different input buffer) into the second pipeline with a stored instruction of the third instruction thread and corresponding stored mode bits. This cycle repeats until the second pipeline has executed all instructions of the first instruction thread on data of the fourth data thread, all instructions of the second instruction thread on data of the fifth data thread, and all instructions of the third instruction thread on data of the sixth data thread. Then, a data value (of a seventh data thread) is launched (from another input buffer) into a third pipeline of TE 18 with a stored instruction of the first instruction thread and corresponding stored mode bits. Then (on the next clock cycle), a data value of an eighth data thread is launched (from a different input buffer) into the third pipeline with a stored instruction of the second instruction thread and corresponding stored mode bits. Then (on the next clock cycle), a data value of a ninth data thread is launched (from a different input buffer) into the third pipeline with a stored instruction of the third instruction thread and corresponding stored mode bits. This cycle repeats until the third pipeline has executed all instructions of the first instruction thread on data of the seventh data thread, all instructions of the second instruction thread on data of the eighth data thread, and all instructions of the third instruction thread on data of the ninth data thread.

Alternatively, the FIG. 3 processor can be configured to operate in a serialized mode in which only one instruction thread is stored at a time. The stored instruction thread is used to process data values of a sequence of two or more data threads (in a sequence of different ones of the pipelines of TE 18), and is then replaced (e.g., overwritten) by another stored instruction thread that is used to process data values of another sequence of data threads (in the same sequence of different pipelines of TE 18).

Upon the last commitment (assertion to one of the pipelines of TE 18) of a stored instruction of a stored instruction thread, the instruction thread is released to make the register (or other hardware) that had temporarily stored the released instruction thread available to store instructions and mode bits of a new instruction thread.

Figure 4:
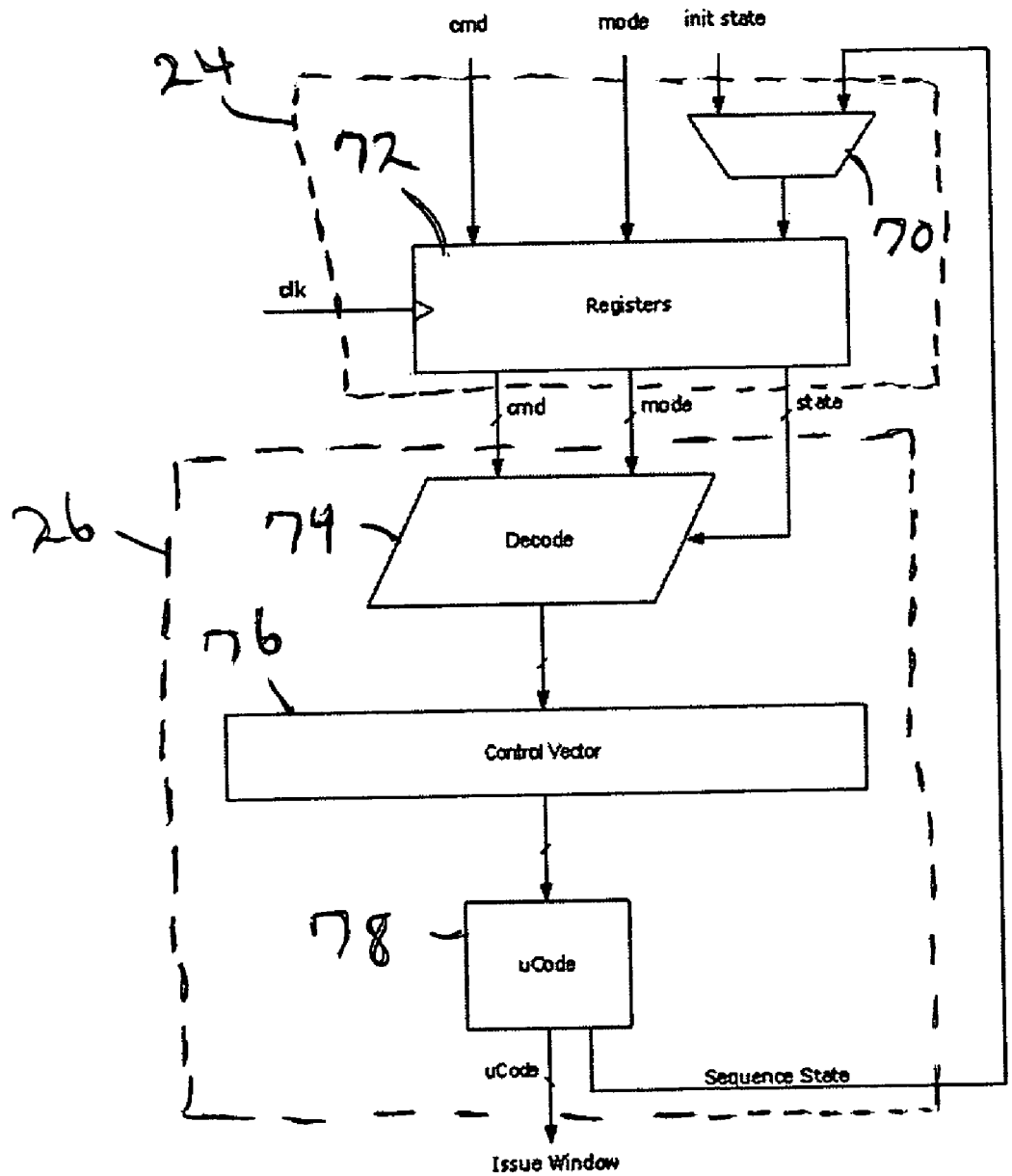
FIG. 4 is a block diagram of an embodiment of control unit 26 and buffer 24 of FIG. 3.

With reference to FIG. 4, we next describe in greater detail the manner in which the FIG. 3 processor fetches instructions in the fixed function mode. FIG. 4 is a block diagram of an embodiment of control unit 26 and buffer unit 24 of FIG. 3. Microcode memory 78 of FIG. 4 stores a predetermined set of instructions that can be asserted to control unit 28 and then to TE 18 (to execute each available fixed function) during fixed function mode operation. Buffer unit 24 includes multiplexer 70 and registers 72 (which implement a buffer). Multiplexer 70 has an input coupled to receive an instruction thread control word (identified as "thread" in FIG. 3, and as "init state" in FIG. 4) from unit 28 and a second input coupled to receive an incremented thread control word (identified as "sequence state" in FIG. 4) from memory 78. During each clock cycle (each cycle of clock "clk") of fixed function mode operation, a command and a set of mode bits (from input interface 10) and a thread control word (from multiplexer 70) can be asserted to the inputs of registers 72, and a command, set of mode bits, and thread control word can be asserted from the outputs of registers 72 to decoder 74. In response to each command, mode bit set, and thread control word, decoder 74 asserts a decoded control word to control vector unit 76. In response to each decoded control word, unit 76 asserts an address word ("control vector") to microcode memory 78 causing memory 78 to assert a corresponding instruction to control unit 28, and causing memory 78 to assert an incremented thread control word to the second input of multiplexer 70. The particular sequence of instructions output from memory 78 is thus dynamically selected by control vector unit 76. Each bit of the control vector can correspond to an instruction stored in memory 78 (so that the "n"th instruction is selected by asserting the control vector with an "n"th bit having the value one and all other bits having the value "zero"). Typically, registers 72 stores sets of mode bits for each of three threads. Multiplexer 70 can be implemented to pass through each newly asserted value of thread control word "init state" (from unit 28), and otherwise to pass through the incremented thread control word "sequence state" from memory 78. Thus, in response to a newly asserted value of thread control word "init state," the mode bits for the corresponding thread are asserted from registers 72 to decoder 74, the resulting incremented thread control word from memory 78 then causes assertion of the mode bits for a second one of the threads from registers 72 to decoder 74, the next resulting incremented thread control word from memory 78 then causes assertion of the mode bits for a third one of the threads from registers 72 to decoder 74, and so on (cyclically) until assertion (by unit 28 to multiplexer 70) of another new value of thread control word "init state."

Control unit 28 responds either to instructions fetched from IRAM 14 (in the program mode) or instructions fetched by control unit 26 from microcode memory 78 (in the fixed function mode), and includes instruction screening and conflict handling logic. The logic is configured to predict conflicts between operation of the pipelines of TE 18 and to prevent TE 18 from executing an illegal operation (including by screening fetched instructions for unsupported bit encoding), and to ensure that there are no stalls in any of the pipelines of TE 18 during execution of an instruction committed to TE 18 from control unit 28.

Control unit 28 controls the operating mode of the FIG. 3 processor in response to the results of the screening of fetched instructions to guarantee predictable outcomes and avoid stalls in operation of TE 18. The screening rules (and operations triggered by unit 28 in response thereto) preferably include the following:

Force a last instruction flag in the very last IRAM location (during "program" mode operation);
Force termination of a program that branches illegally;
Replace each illegal instruction by a NOP instruction;
Replace each illegal operand by the contents of a predetermined input buffer;
Force "no write" operations in response to detection of illegal target register writes;
Force "no output" write operations in response to detection of instructions (e.g., address register load or branch instructions) without valid results;
Force illegal operand types to types that can legally be present in the input buffers;
Disable output writes (to an output buffer) by "constant generation" programs; and
Force a reserve slot write at the end of an illegal program that does not generate any outputs.

Typically, instruction branching is only supported in "program" mode operation. As shown in the flow chart of FIG. 5, mode control circuitry (sometimes referred to herein as conflict-handling logic) in unit 28 determines (at step 80 of FIG. 5) whether each fetched instruction is a branch instruction before the instruction is committed to TE 18. If the instruction is not a branch instruction, the instruction is issued (at step 83), control unit 28 determines (at step 84) that no branch is to be taken, and control unit 28 determines (at step 89) whether TE 18 is operating in a parallel processing mode and whether execution of the instruction would cause a conflict requiring operation in the above-described limited serialized mode. If it is determined that TE 18 is operating in a parallel processing mode and that a conflict is predicted, then unit 28 (at step 90) triggers operation in the limited serialized mode. During operation in the limited serialized mode, unit 28 determines (at step 91) whether all data values to be processed in the limited serialized mode have been launched into TE 18. When the last data value to be processed in the limited serialized mode has been launched into TE 18, unit 28 terminates the limited serialized mode (in step 88) and causes the FIG. 3 processor to resume operation in the mode in which it operated prior to step 89. If unit 28 determines in step 89 (upon launching an instruction to TE 18 in step 83) that TE 18 is in a mode in which only one pipeline of TE 18 receives data per clock cycle, or that the launched instruction will not cause any conflict, unit 28 does not change the operating mode of the FIG. 3 processor (operation continues, in step 88, without a mode change).

Upon detecting a branch instruction, the conflict-handling logic in control unit 28 (at step 81) backs up the relevant program counter (saves the count in a backup register), and backs up the return address stack and the stack pointer to backup registers. Then (at step 82, before the branch instruction is launched into TE 18), the conflict-handling logic resolves the branch.

While resolving the branch in step 82, the conflict-handling logic places the system in a state in which it is ready to fetch the next instruction from the relevant program counter (the instruction that would follow the branch instruction if the branch is not taken) if it is determined (as a result of steps 82 and 84) that the branch will not be taken. This is done to allow normal program flows in the event that it is determined (as a result of steps 82 and 84) that the branch will not be taken. If it is determined (as a result of steps 82 and 84) that the branch will be taken, but that the branch will be taken to the same target in all pipelines, the conflict-handling logic ensures that the target will be fetched from the relevant program counter (after the branch instruction is launched to TE 18).

During step 82, a conditional branch is resolved (thus terminating step 82) when its condition code ("CC") has no write-read dependency. During step 82, an index branch (for which the address of the target depends on some data value generated in or retrieved by TE 18 during execution) is resolved (thus terminating step 82) when the address register has no write-read dependency. When the branch is resolved, step 82 terminates, the branch instruction is issued (at step 83), and it is determined (at step 84) whether the branch will be taken and if so in which pipeline (or pipelines) it will be taken.

If it is determined (at step 84) that the branch will not be taken, or that it will be taken to the same target in all pipelines, steps 89 and 88 (or 89, 90, 91, and 88) are performed. At step 89, control unit 28 determines whether TE 18 is operating in a parallel processing mode and whether execution of the branch instruction would cause a conflict requiring operation in the above-described limited serialized mode. During step 89, if unit 28 determines that TE 18 is operating in a parallel processing mode and predicts a conflict, it triggers operation in the limited serialized mode (at step 90). During operation in the limited serialized mode, unit 28 determines (at step 91) whether all data values to be processed in the limited serialized mode have been launched into TE 18. When the last data value to be processed in the limited serialized mode has been launched into TE 18, unit 28 terminates the limited serialized mode (in step 88) and causes the FIG. 3 processor to resume operation in the mode in which it operated as of the launch of the branch instruction in step 83 (and step 80 is performed for the instruction that is to follow the launched branch instruction). If the branch instruction has been launched to TE 18 in step 83, and unit 28 determines in step 89 that TE 18 is in a mode in which only one pipeline of TE 18 receives data during each clock cycle or that the launched instruction will cause no conflict, unit 28 does not change the operating mode of the FIG. 3 processor (step 88 is performed, causing the processor to continue to operate in the same mode in which it operated as of the launch of the branch instruction in step 83).

If it is determined (at step 84) that the branch will be taken during processing of a data value (in accordance with the branch instruction) in any of the pipelines of TE 18, and that the branch will not be taken to the same target in all the pipelines, control unit 28 (e.g., logic 110 within unit 28, described below with reference to FIG. 6) causes the FIG. 3 processor to operate as follows. The processor enters the above-described "fully serialized" mode of operation and performs step 85. In step 85, a data value (belonging to a first thread) is loaded into a first pipeline of TE 18 (for processing in accordance with the branch instruction), and invalidated instructions (NOP instructions) are asserted to the other pipelines, so that data processing in all other pipelines halts. Commencing at step 85, control unit 28 invalidates all subsequent instructions (after the branch instruction) that are asserted to the first pipeline (for processing data of the first thread in the first pipeline) until the program counter for the first thread (PC0, PC1, or PC2) is loaded from the branch target (at step 87). During step 86 (after step 85 and before step 87), a stack operation is performed depending on the type of the branch instruction. After step 87 (when the program counter for the relevant thread has been loaded from the branch target), operation in the serialized mode continues (in step 88) until all instructions of the instruction thread have been executed in the first pipeline on data values of the relevant data thread. Then (still during step 88), operation in the serialized mode continues by restoring the backup store (the program count that was backed up during step 81) to the instruction fetch circuitry, and processing data values of a second data thread in a second pipeline of TE 18 (while operation of the first and third pipelines of TE 18 is halted), commencing with processing of a data value (the data value that was in one of the input buffers 16 coupled to the second pipeline at the time of issuance of the branch instruction to the first pipeline in step 83) in accordance with the branch instruction determined by the program count that was backed up during step 81. Operation continues in the serialized mode continues until all instructions of the instruction thread have been executed in the second pipeline on data values of the second data thread. Then (still during step 88), operation in the serialized mode continues by again restoring the backup store (the program count that was backed up during step 81) to the instruction fetch circuitry, and processing data values of a third data thread in a third pipeline of TE 18 (while operation of the first and second pipelines of TE 18 is halted), commencing with processing of a data value (the data value that was in one of the input buffers 16 coupled to the third pipeline at the time of issuance of the branch instruction to the first pipeline in step 83) in accordance with the branch instruction determined by the program count that was backed up during step 81. Operation continues in the serialized mode continues until all instructions of the instruction thread have been executed in the third pipeline on data values of the third data thread. When all three pipelines have finished executing the instruction thread, the instruction thread is marked "done," and control unit 28 terminates operation in the serialized mode and causes the FIG. 3 processor to resume operation in the mode in which it operated prior to identification of the branch instruction in step 80.

Figure 5:
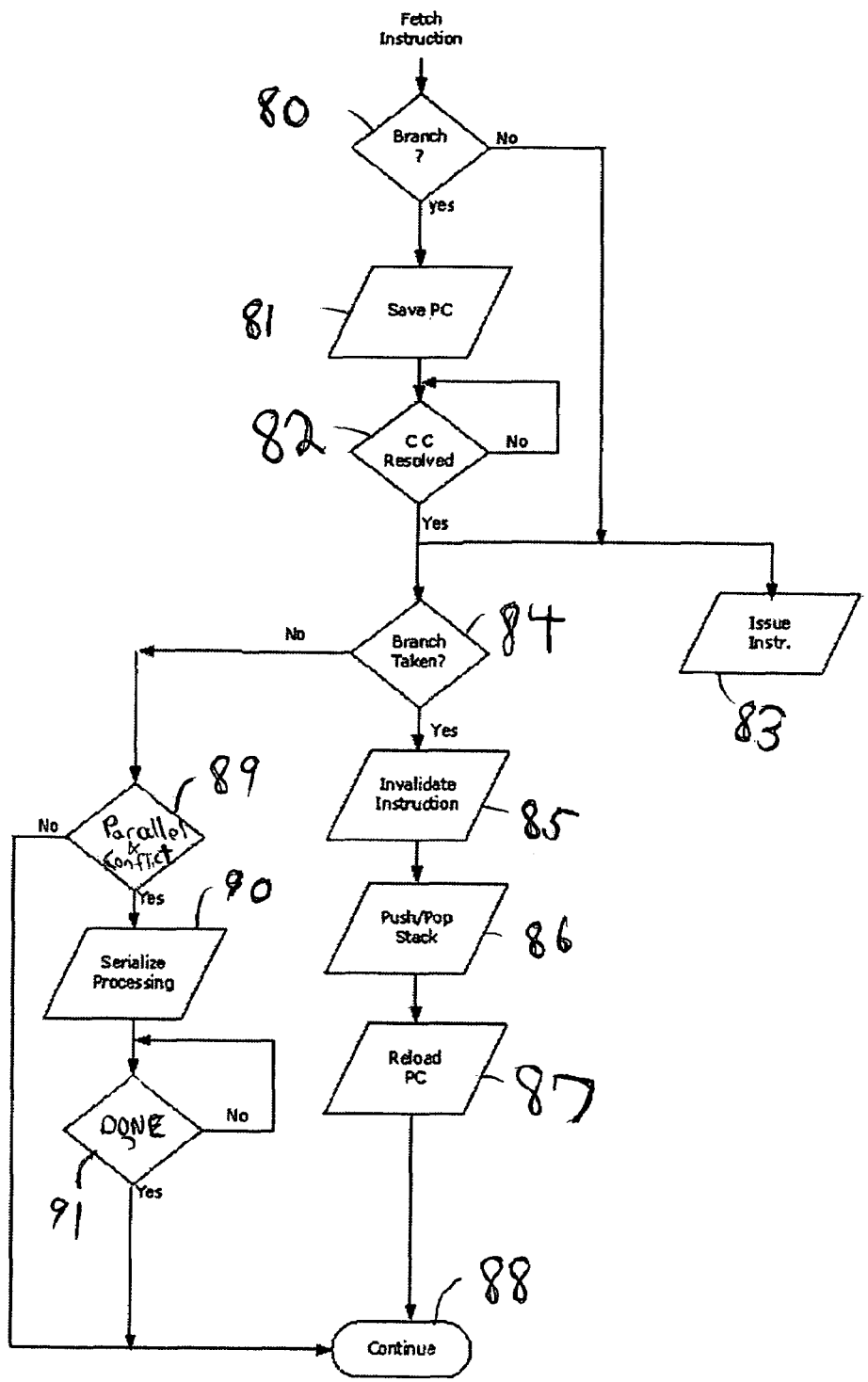
FIG. 5 is flow chart of steps performed by conflict-handling logic in unit 28 of FIG. 3 to identify and resolve branch instructions (before they are committed to transform engine 18) and to determine the mode in which transform engine 18 operates while executing each branch instruction.
Figure 8:
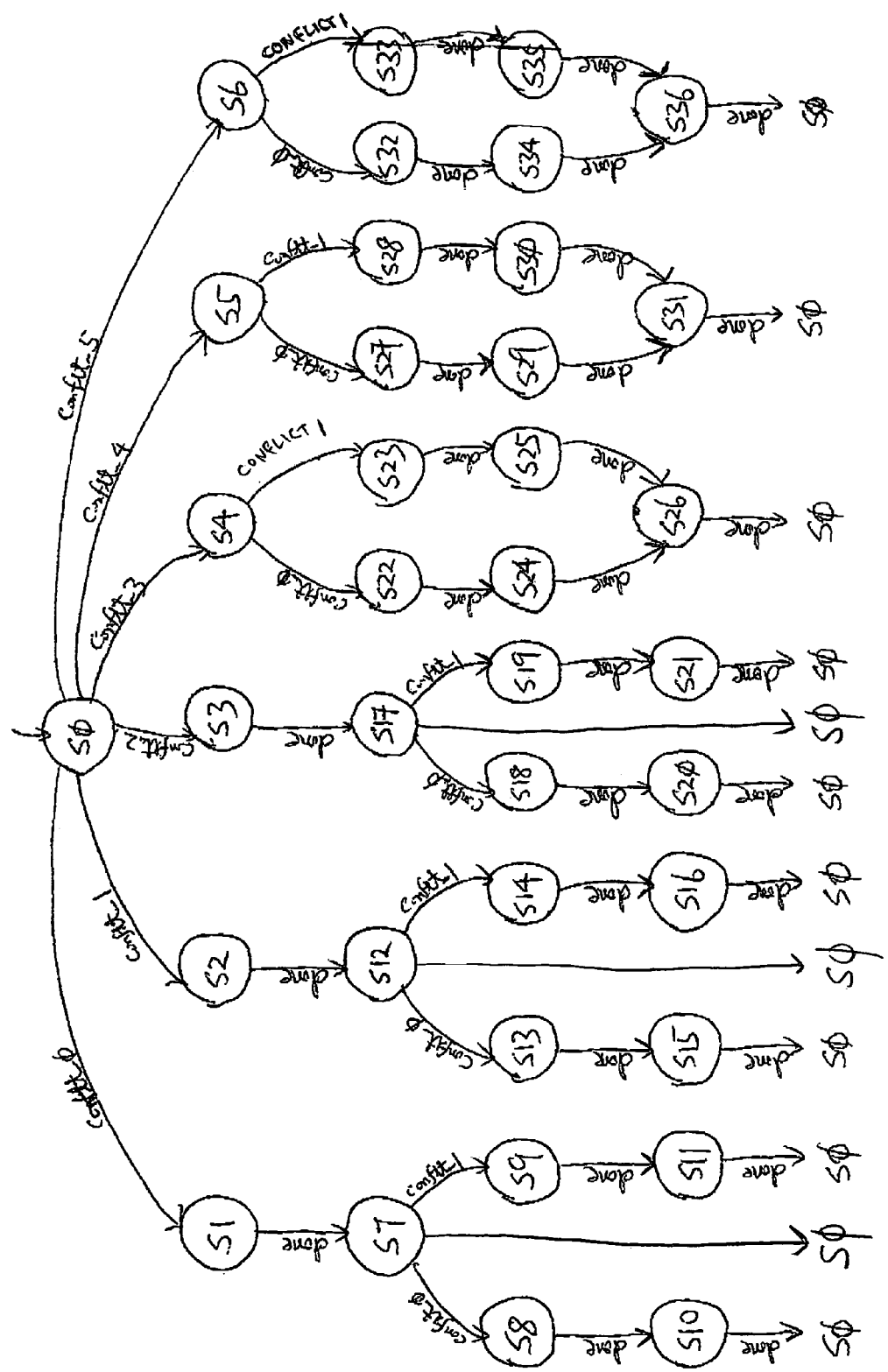
FIG. 8 is a state diagram for a class of embodiments of the inventive processor, showing sequences of states in which the processor can operate in response to identification of a branch instruction to be executed.

With reference to FIG. 8, we next describe in greater detail an example of the processor states that logic 110 (shown in FIG. 6) of unit 28 can trigger during performance of steps 85, 86, 87, and 88 of FIG. 5 when it has determined that a branch will be taken (in at least one pipeline of TE 18) during execution of an issued branch instruction, and that the branch will not be taken to the same target in all the pipelines of TE 18. In state S0 (of FIG. 8), TE 18 is ready to begin execution of a new instruction and is optionally also executing at least one previously issued instruction (but is not executing a previously issued branch instruction whose branch must be taken in at least one pipeline of TE 18). The FIG. 3 processor returns to state S0 after TE 18 has executed an issued branch instruction (including by taking a branch) in all pipelines of TE 18.

In state S0, if logic 110 determines (in step 84 of FIG. 5) that the branch of a not-yet-executed branch instruction will be taken in only a first pipeline ("P0") of TE 18, then it causes the processor to undergo a transition from state S0 to state S1. In state S0, if logic 110 determines that the branch will be taken in only a second pipeline ("P1") of TE 18, then it causes the processor to undergo a transition from state S0 to state S2. In state S0, if logic 110 determines that the branch will be taken in only a third pipeline ("P2") of TE 18, then it causes the processor to undergo a transition from state S0 to state S3. In state S0, if logic 110 determines that the branch will be taken in both P0 and P1, then it causes the processor to undergo a transition from state S0 to state S4. In state S0, if logic 110 determines that the branch will be taken in both P0 and P2, then it causes the processor to undergo a transition from state S0 to state S5. In state S0, if logic 110 determines that the branch will be taken in both P1 and P2, then it causes the processor to undergo a transition from state S0 to state S5.

In state S1, when P0 is done executing the branch instruction, the processor undergoes a transition from state S1 to state S7. It is determined in step S7 whether the branch will be taken in one or both of P1 and P2 during execution of the same branch instruction. If it is determined that the branch will be taken in neither P1 nor P2, the processor enters a mode in which both P1 and P2 execute the branch instruction in parallel (possibly with one or more periods of limited serialized mode operation). In this mode, step 89 of FIG. 5, followed by either step 88 or the sequence of steps 90, 91, and 88 of FIG. 5, are performed, and the processor returns to state S0 from state S7 when the branch instruction has been executed in both P1 and P2. In state S7, if it is determined that the branch will be taken in P1 only, the processor undergoes a transition from state S7 to state S8. In state S7, if it is determined that the branch will be taken in P2 only, the processor undergoes a transition from state S7 to state S9. In state S8, the branch instruction is executed in P1, and the processor then undergoes a transition to state S10 in which the branch instruction is executed in P2. When the branch instruction has been executed in P2 (with the processor in state S10), the processor returns to state S0. Similarly, in state S9, the branch instruction is executed in P2, and the processor then undergoes a transition to state S11 in which the branch instruction is executed in P1. When the branch instruction has been executed in P1 (with the processor in state S11), the processor returns to state S0.

In state S2, when P1 is done executing the branch instruction, the processor undergoes a transition from state S2 to state S12. It is determined in step S12 whether the branch will be taken in one or both of P0 and P2. If it is determined that the branch will be taken in neither P0 nor P2, the processor enters a mode in which both P0 and P2 execute the branch instruction in parallel (possibly with one or more periods of limited serialized mode operation). In this mode, step 89 of FIG. 5, followed by either step 88 or the sequence of steps 90, 91, and 88 of FIG. 5, are performed, and the processor returns to state S0 from state S12 when the branch instruction has been executed in both P0 and P2. In state S12, if it is determined that the branch will be taken in P0 only, the processor undergoes a transition from state S12 to state S13. In state S12, if it is determined that the branch will be taken in P2 only, the processor undergoes a transition from state S12 to state S14. In state S13, the branch instruction is executed in P0, and the processor then undergoes a transition to state S15 in which the branch instruction is executed in P2. When the branch instruction has been executed in P2 (with the processor in state S15), the processor returns to state S0. Similarly, in state S14, the branch instruction is executed in P2, and the processor then undergoes a transition to state S16 in which the branch instruction is executed in P0. When the branch instruction has been executed in P0 (with the processor in state S16), the processor returns to state S0.

In state S3, when P2 is done executing the branch instruction, the processor undergoes a transition from state S3 to state S17. It is determined in step S17 whether the branch will be taken in one or both of P0 and P1. If it is determined that the branch will be taken in neither P0 nor P1, the processor enters a mode in which both P0 and P1 execute the branch instruction in parallel (possibly with one or more periods of limited serialized mode operation). In this mode, step 89 of FIG. 5, followed by either step 88 or the sequence of steps 90, 91, and 88 of FIG. 5, are performed, and the processor returns to state S0 from state S17 when the branch instruction has been executed in both P0 and P1. In state S17, if it is determined that the branch will be taken in P0 only, the processor undergoes a transition from state S17 to state S18. In state S17, if it is determined that the branch will be taken in P1 only, the processor undergoes a transition from state S17 to state S19. In state S18, the branch instruction is executed in P0, and the processor then undergoes a transition to state S20 in which the branch instruction is executed in P1. When the branch instruction has been executed in P1 (with the processor in state S20), the processor returns to state S0. Similarly, in state S19, the branch instruction is executed in P1, and the processor then undergoes a transition to state S21 in which the branch instruction is executed in P0. When the branch instruction has been executed in P0 (with the processor in state S21), the processor returns to state S0.

In state S4, the processor enters the serialized mode of operation and undergoes a transition to state S22 or state S23. In state S22, the branch instruction is executed in P0, and the processor then undergoes a transition to state S24 in which the branch instruction is executed in P1. When the branch instruction has been executed in P1 (with the processor in state S24), the processor then undergoes a transition to state S26 in which the branch instruction is executed in P2. In state S23, the branch instruction is executed in P1, and the processor then undergoes a transition to state S25 in which the branch instruction is executed in P0. When the branch instruction has been executed in P0 (with the processor in state S25), the processor then undergoes a transition to state S26. When the branch instruction has been executed in P2 (with the processor in state S26), the processor returns to state so.

In state S5, the processor enters the serialized mode of operation and undergoes a transition to state S27 or state S28. In state S27, the branch instruction is executed in P0, and the processor then undergoes a transition to state S29 in which the branch instruction is executed in P2. When the branch instruction has been executed in P2 (with the processor in state S29), the processor then undergoes a transition to state S31 in which the branch instruction is executed in P1. In state S28, the branch instruction is executed in P2, and the processor then undergoes a transition to state S30 in which the branch instruction is executed in P0. When the branch instruction has been executed in P0 (with the processor in state S30), the processor then undergoes a transition to state S31. When the branch instruction has been executed in P1 (with the processor in state S31), the processor returns to state S0.

In state S6, the processor enters the serialized mode of operation and undergoes a transition to state S32 or state S33. In state S32, the branch instruction is executed in P1, and the processor then undergoes a transition to state S34 in which the branch instruction is executed in P2. When the branch instruction has been executed in P2 (with the processor in state S34), the processor then undergoes a transition to state S36 in which the branch instruction is executed in P0. In state S33, the branch instruction is executed in P2, and the processor then undergoes a transition to state S35 in which the branch instruction is executed in P1. When the branch instruction has been executed in P1 (with the processor in state S35), the processor then undergoes a transition to state S36. When the branch instruction has been executed in P0 (with the processor in state S36), the processor returns to state so.

Figure 6:
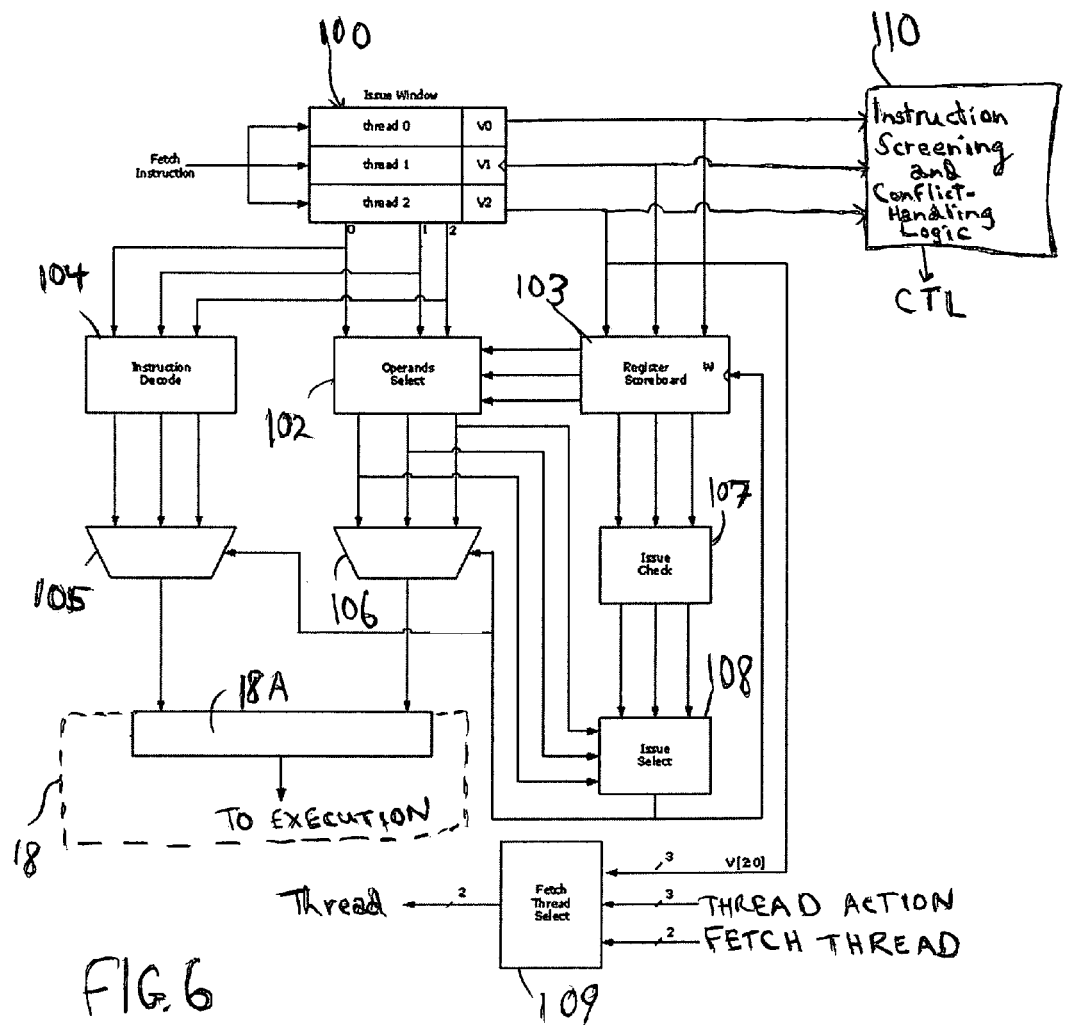
FIG. 6 is a block diagram of elements of an embodiment of control unit 28 of FIG. 3, and an element of transform engine 18 of FIG. 3.

With reference to FIG. 6, we next describe the structure and operation of control unit 28 in greater detail, including the mode control circuitry and related elements thereof.

FIG. 6 is a block diagram of elements of an embodiment of control unit 28, with TE 18 (including input buffer 18A of one pipeline of TE 18, which receives an instruction and a data value once per clock cycle for processing in the pipeline). Issue window 100 has three issue slots, for receiving fetched instructions for processing data values of three different data threads in three different pipelines of TE 18. A sequence of instructions for processing three different data threads can be fetched (sequentially) into each single slot of window 100, so that the three data threads can be processed in interleaved fashion in one pipeline of TE 18. A decoded version of each valid instruction fetched into window 100 can be issued to TE 18. Three instructions (each from a different slot of window 100) are decoded in parallel in decoder 104, the resulting decoded instructions are asserted to inputs of multiplexer 105. The slots of window 100 are labeled "V0," "V1," and "V2" to denotes "vertex 0," "vertex 1," and "vertex 2" since each set of three instructions simultaneously present in window 100 are typically for processing data of three different vertices. As noted above, control unit 28 preferably includes circuitry for substituting NOP instructions for selected ones of the instructions in the issue window in some modes of operation. An implementation of decoder 104 (that operates under control of issue select unit 108) can perform such substitution of NOP instructions.

During each clock cycle, multiplexer 105 passes a selected one of the three decoded instructions (determined by a thread control signal output from issue select unit 108) from decoder 104 to input buffer 18A of TE 18. Input buffer 18A asserts each instruction that it receives to a first pipeline of TE 18.

TE 18 also includes another input buffer (identical to buffer 18A but not shown) for each of its other two pipelines, and control unit 28 also includes another multiplexer (identical to multiplexer 105 but not shown in FIG. 6) coupled between decoder 104 and each of the two other input buffers of TE 18. Issue select unit 108 independently controls each of the multiplexers (and decoder 104, to determine the decoded instructions asserted to the inputs of each multiplexer) to control the operating mode of TE 18.

In the parallel processing mode, an instruction for processing data of a first data thread (identified as "thread 0" in FIG. 6) is decoded and asserted to input buffer 18A in one clock cycle, an instruction for processing data of a second data thread (identified as "thread 1" in FIG. 6) is asserted to input buffer 18A in the next clock cycle, an instruction for processing data of a third data thread (identified as "thread 2" in FIG. 6) is asserted to input buffer 18A in the next clock cycle, and so on. By simultaneously asserting the same sequence of instructions to the other two input buffers of TE 18, the FIG. 3 processor can process nine different threads of data in interleaved fashion in the parallel processing mode.

Instruction screening and conflict handling logic 110 of FIG. 6 implements the operations described above with reference to FIG. 5, checks whether instructions fetched into window 100 are valid instructions and whether any of them is a "conflict-causing" instruction (as defined above), and generates control signals for triggering "limited" serialized mode operation in response to conflict-causing instructions.

Other circuitry (shown in FIG. 6) of control unit 28 is responsible for data dependency checking for each instruction in issue window 100. Specifically, unit 107 performs data dependency checking for each such instruction, and unit 108 uses the results of such checking to control the sequence in which the instructions are launched into TE 18. In embodiments in which each pipeline of TE 18 includes a vector pipeline that supports at least one of operand swizzling and results output masking (as does the pipeline of FIG. 7, to be discussed below), the data dependency checking should be performed for each component (e.g., each "x," "y," "z," and "w" component) of each data value to be processed in TE 18.

Operand selection logic 102 determines the source (e.g., from among input data buffers 16, constant memory 20, and register file 22) of the data value to be asserted to input buffer 18A (with each instruction asserted to one of the inputs of multiplexer 105) and asserts (to multiplexer 106) operand source control signals indicative of this determination. Multiplexer 106 passes a selected one of the operand source control signals in response to the thread control signal from issue select unit 108. In response to the selected operand source control signal, input buffer 18A accepts the appropriate operand to be processed with the current instruction (received from multiplexer 105). Operand selection logic 102 also determines the source of the data values to be accepted by the other two input buffers of TE 18 (identical to buffer 18A) for processing in accordance with the instructions asserted thereto by the other two multiplexers (corresponding to multiplexer 105). Unit 102 also asserts the operand source control signals to issue select logic 108.

Unit 102 operates in response to status bits from scoreboard register unit 103 to ensure that write-read dependencies are properly maintained. Unit 103 is coupled to receive the instructions in issue window 100 and the thread control signal from issue select unit 108, and passes the instructions through to issue check unit 107 after extracting read-write dependency information from them. Unit 103 includes registers in which it records bits indicative of whether each instruction in window 100 (when launched into TE 18) will cause at least one component of a data value to be written to or read from a register at each stage of each pipeline of TE 18. In implementations in which TE 18 includes three pipelines, each pipeline having six pipeline stages, unit 103 preferably includes a set of scoreboard registers for each of three data threads that can be processed in parallel in the pipelines. Each such set of scoreboard registers includes at least one register for each different one of the "x," "y," "z," and "w" components of the data being processed, for each of the six pipeline stages.

Issue check logic 107 performs the data dependency check on the instructions that have been fetched into issue window 100. In response to the results of the data dependency check, issue select logic 108 applies predetermined rules to control the sequence in which the three instructions in window 100 should be launched.

For each instruction (in window 100) to be issued to TE 18, issue select unit 108 preferably determines the order in which the instruction is issued (relative to issuance of other instructions in window 100) as follows:

a. normally, the instructions are issued cyclically in order of the corresponding data thread numbers (e.g., an instruction for processing data from data thread number "0," then an instruction for processing data from data thread number "1," then an instruction for processing data from data thread number "2," then an instruction for processing data from data thread number "0," and so on);

b. an instruction whose execution will cause a bypass of an intermediate result between pipeline stages (in a manner to be discussed below with reference to FIG. 7) so as to achieve at least a predetermined minimum time saving (e.g., a minimum time saving of three clock cycles), is issued before one that does not cause such a bypass (to avoid an additional stall of some number of clock cycles in operation of TE 18 if this chance is missed); and c. where there is a pending fetched instruction (to be written into issue window 100), an instruction (already written into issue window 100) having the same thread ID number is issued first to minimize fetch busy cycles.

Figure 7:
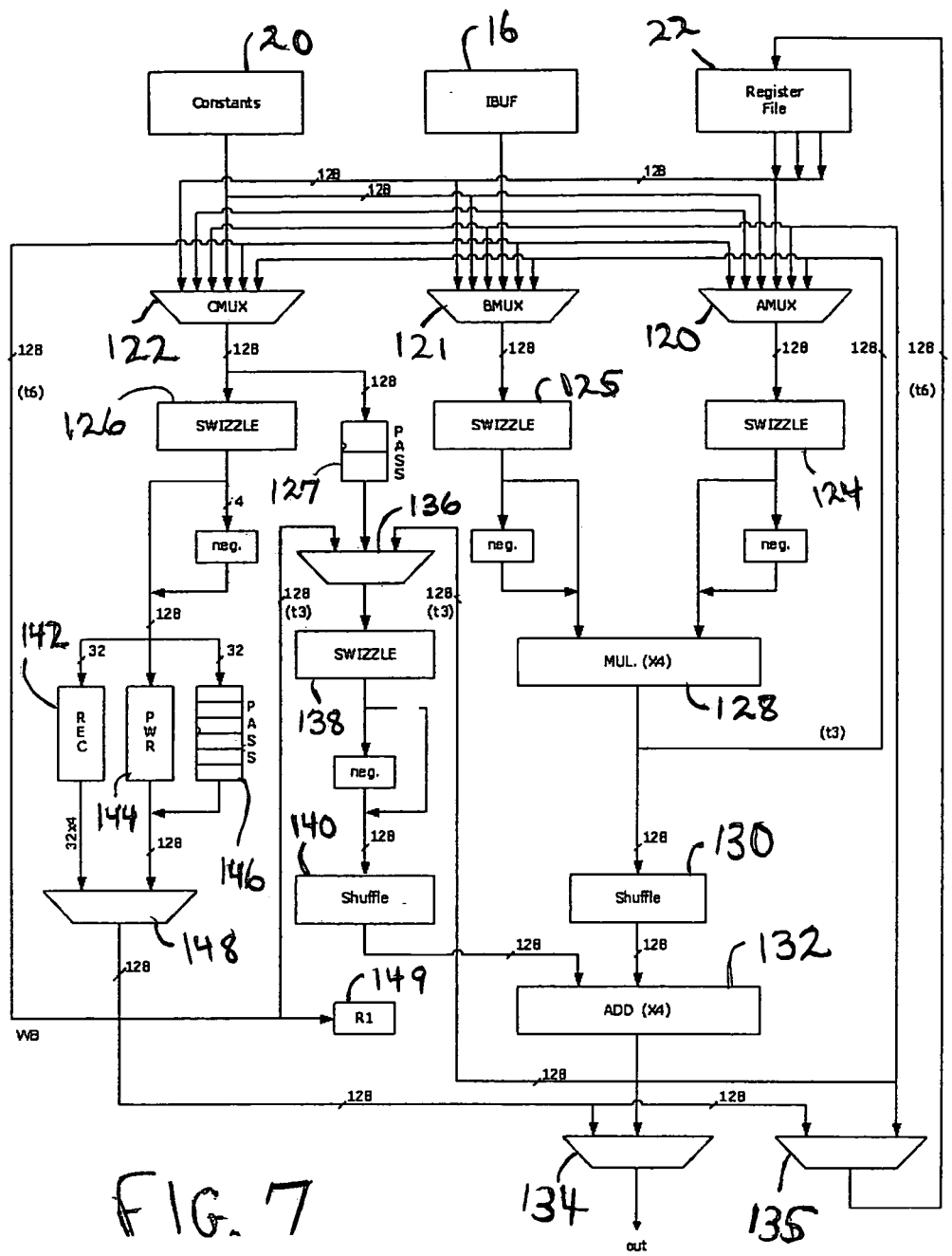
FIG. 7 is a block diagram of one pipeline of an embodiment of transform engine 18 of FIG. 3.

Next, with reference to FIG. 7, we describe one of the three instruction execution pipelines of a preferred embodiment of TE 18, with constant memory 20 (implemented as a random access memory), input buffer unit 16, and register file 22. In this embodiment, TE 18 includes two additional instruction execution pipelines (each identical to the FIG. 7 pipeline) connected in parallel with the FIG. 7 pipeline to the outputs of constant memory 20, input buffer unit 16, and register file 22 (so that the three pipelines share memory 20, buffer unit 16, and register file 22).

The instruction execution pipeline of FIG. 7 includes two six-stage floating-point processing pipes: a four-component-wide (vector) multiply-add pipeline (comprising multiplexers 120, 121, swizzle units 124 and 125, multiplier 128 (which can execute dot product instructions), shuffle unit 130, adder 132, multiplexer 136, swizzle unit 138, and shuffle unit 140, connected as shown) responsible for all MUL, ADD, MAC, and dot-product operations; and a scalar pipeline (comprising multiplexer 122, swizzle unit 126, reciprocal unit 142 (which can execute reciprocal and reciprocal square root instructions), power unit 144 (which can execute Exp2, Log2, and Pwr instructions), FIFO buffer 146, multiplexer 148, and FIFO buffer 127, connected as shown) that executes reciprocal, reciprocal-square-root, exponential, logarithmic, and power instructions. Each of swizzle units 124, 125, 126, and 138 functions to duplicate and/or reorder the components of the ordered set of four components (each comprising 32 bits) of the data value that it receives, and the output of each swizzle unit can be negated. Even though the scalar pipeline is identified as "scalar," it can also pass through three (32-bit) floating-point data values at the same time that it performs a particular mathematical operation on fourth (32-bit) operand.

Data from input buffers 16, constant memory 20, and/or three-read register file 22 can be asserted to inputs of one or more of multiplexers 120, 121, and 122, and a selected 128-bit input data value is passed through each of multiplexers 120, 121, and 122 during each clock cycle. The processed 128-bit data values emerging from the vector and scalar pipelines of FIG. 7 are asserted to multiplexers 134 and 135. During each clock cycle, a selected ones of these values is written back to register file 22 (from multiplexer 135) and/or asserted to above-mentioned buffers 31 of FIG. 3 (from multiplexer 134). The output of multiplexer 148 can also be written to register 149, asserted to an input of multiplexer 136, and/or written back to an input of each of multiplexers 120, 121, and 122. The output of adder 132 can also be asserted to an input of multiplexer 136 and/or written back to an input of each of multiplexers 120, 121, and 122.

Preferably, FIG. 7 is implemented to be capable of bypassing intermediate results between elements thereof (in a manner to be explained below) whenever necessarily to reduce stalling cycles. For example, the FIG. 7 circuitry is preferably implemented to perform the following eight bypasses:

adder-multiplier-t6 (a result is bypassed directly the output of adder 132 to the input of multiplier 128);

adder-scalar-t6 (a result is bypassed directly from the output of adder 132 to an input of multiplexer 122);

adder-adder-t3 (a result is bypassed directly from the output of adder 132 to the output of shuffle unit 140);

multiplier-multiplier-t3 (a result is bypassed directly from the output of multiplier 128 to the input of multiplier 128);

multiplier-scalar-t3 (a result is bypassed directly from the output of multiplier 128 to an input of multiplexer 122);

scalar-multiplier-t6 (a result is bypassed directly from the output of multiplexer 148 to the input of multiplier 128);

scalar-adder-t3 (a result is bypassed directly from the output of multiplexer 148 to the output of shuffle unit 140); and scalar-scalar-t6 (a result is bypassed directly from the output of multiplexer 148 to an input of multiplexer 122).

We next continue the description of FIG. 6 by explaining in greater detail the circumstances in which an embodiment of issue select unit 108 causes an instruction in window 100 (to be referred to as a "high-priority" instruction) to be issued before other instructions in window 100 when issue check logic 107 has determined that execution of the high-priority instruction will cause a bypass of an intermediate result between pipeline stages. Preferably, issue check logic 107 is configured to identify each instruction whose execution would result in one of the bypass operations listed above ("adder-multiplier-t6;" "adder-scalar-t6;" "adder-adder-t3;" "multiplier-multiplier-t3;" "multiplier-scalar-t3;" "scalar-multiplier-t6;" "scalar-adder-t3;" and "scalar-scalar-t6"). The notation "t3" denotes a bypass having three cycle producer-consumer latency," and "t6" denotes a bypass having six cycle producer-consumer latency. Since execution of an instruction that results in an "adder-adder-t3," "multiplier-multiplier-t3," "multiplier-scalar-t3," or "scalar-adder-t3" operation requires fewer clock cycles than execution of an instruction that results in an "adder-multiplier-t6," "adder-scalar-t6;" "scalar-multiplier-t6," or "scalar-scalar-t6" operation (or an instruction that does not cause a bypass of an intermediate result between pipeline stages), unit 108 considers an instruction that results in an "adder-adder-t3," "multiplier-multiplier-t3," "multiplier-scalar-t3," or "scalar-adder-t3" operation to be a "high-priority" instruction that is issued before other instructions in window 100 that are not "high-priority" operations.

Thread select logic 109 of FIG. 6 operates in response to the instructions currently in window 100, a control word ("Fetch Thread") indicating that the next instruction is to be fetched, and control bits ("Thread Action") indicating whether instructions of specific instruction threads should or should not be fetched. Because the FIG. 3 processor can only fetch one instruction at a time and the fetch bus is for one instruction only, thread select logic 109 is configured to generate the control word "Thread" (the above-discussed control word that determines the thread of the next instruction to be fetched into window 100) in an intelligent manner to minimize unnecessary fetch busy states due to occupied issue slots in issue window 100. Logic 109 attempts to prevent the situation that an instruction (in window 100) awaiting issuance into TE 18 blocks fetches of instructions of the other two instruction threads into empty slots in window 100. Thread select logic 109 preferably determines the order in which instructions of different instruction threads are fetched as follows:

a. unless another criterion provides otherwise, a round-robin scheme is used (so that an instruction of a first instruction thread is fetched, an instruction of a second instruction thread is then fetched, an instruction of a third instruction thread is fetched, the next instruction of the first instruction thread is then fetched, and so on);

b. only valid threads are selected (so that invalid threads are excluded from the round-robin fetching sequence); and c. a thread with a valid instruction in issue window 100 is given the lowest priority (to increase the likelihood that this instruction will be issued into TE 18 before an attempt is made to fetch the next instruction from the same instruction thread into window 100).

As noted above, instruction screening and conflict handling logic 110 of FIG. 6 checks whether instructions in window 100 are valid instructions and whether any of them is a "conflict-causing" instruction (as defined above), and generates control signals for triggering "limited" serialized mode operation in response to conflict-causing instructions. Specifically, during the parallel processing mode, logic 110 detects any instruction in window 100 that employs indexed-addressing of constant data, and triggers the above-mentioned "limited" serialized mode of operation at the appropriate time upon (or after) issuance of such instruction from window 100. In the parallel processing mode, the pipelines of TE 18 share constant data as well as instructions. The constant data are usually the same in all the pipelines except when indexed-addressing occurs, which is also dependent on the different data values being launched into the pipelines. For this reason, whenever indexed-addressing is detected, logic 110 assumes that a conflict would occur if multiple pipelines of TE 18 were to execute the relevant instruction in parallel, and logic 110 triggers "limited" serialized mode operation to serialize access to the constant by the pipelines.

As also noted above, instruction screening and conflict handling logic 110 of FIG. 6 implements the operations described above with reference to FIGS. 5 and 8.

With reference again to FIG. 3, buffers 31 are allocated (assigned to receive a transformed version of a data value from a corresponding one of buffers 16) at the time of each launch into TE 18. Thus, a "full" state of any of buffers 31 can stall a launch into TE 18. In addition to being operable to execute microcode sequences (fetched from control unit 41), lighting engine ("LE") 36 is preferably also operable in a bypass mode in which whatever data is asserted by TE 18 (into buffers 31) is routed directly to the output of LE 36 (so that LE 36 implements a "bypass output" function). In such a preferred embodiment, processing of a data thread by LE 36 is considered to be done only when both the microcode sequence function and the bypass output function are finished.

In a typical implementation, LE 36 includes a single multi-stage pipeline capable of performing a reciprocal operation (typically on data in a reduced precision floating-point format such as "s8e13 m") or a multiply-add operation, and also a full single precision multiply-add operation (e.g., for implementing a viewport scaling operation). Preferably, the circuitry for implementing the full single precision multiply-add operation can also be used to enhance at least some light calculations. Preferably, LE 36 includes a multiplexer having a first input coupled directly to buffers 31 and second input coupled to the output of the pipelined processing stages within LE 36. The multiplexer's output is the output of LE 36. During each clock cycle, LE 36 preferably detects whether data is being asserted to the second input of the multiplexer. If so, the multiplexer passes through the data at the multiplexer's second input. If not, the bypass output function takes over the output bus and the multiplexer passes through data (if any) being asserted from buffers 31 to the multiplexer's first input. In this way, maximum utilization of output bandwidth is achieved.

In a class of embodiments (including the FIG. 3 embodiment), the invention is a programmable, pipelined graphics processor having at least two processing pipelines. Each pipeline processes data in accordance with a program, including by executing branch instructions. The processor is operable in at least one parallel processing mode in which N data values (where $N \geq 2$) to be processed in parallel in accordance with the same program are launched simultaneously into N pipelines, and at least one fully serialized mode in which only one pipeline at a time receives input data values to be processed in accordance with the program (and operation of each other pipeline is frozen). During operation in each parallel processing mode, mode control circuitry recognizes and resolves branch instructions to be executed (before processing of data in accordance with each branch instruction starts) and causes the processor to operate in a fully serialized mode when it determines that a branch will be taken in at least one pipeline (and that the branch will not be taken to the same target in all the pipelines). Preferably the mode control circuitry also recognizes other instructions whose execution is predicted to cause conflicts between pipelines (e.g., instructions that would require simultaneous reading of different constants from a single shared memory in the parallel processing mode for processing data in multiple pipelines) and causes the processor to enter another serialized mode (e.g., a limited serialized mode) to prevent such conflicts. When the processor operates in a fully serialized mode or limited serialized mode it has a lower throughput rate than in the parallel processing mode. Typically, the processor receives multiple threads of data values (each thread typically comprising data for a different vertex) and processes different data threads in "lock-step" in different pipelines in the parallel processing mode (so that during each clock cycle, all pipelines receive data to be processed in accordance with the same instruction but each pipeline receives data belonging to a different thread) unless and until the processor recognizes that an instruction to be executed requires that the processor enter a serialized mode.

In another class of embodiments, the invention is a programmable, pipelined graphics processor having at least two processing pipelines. The processor is operable in at least one parallel processing mode in which N data values (where $N \geq 2$) to be processed in parallel in accordance with the same program are launched simultaneously into N pipelines, and in a "limited" serialized mode in which operation of each of a sequence of pipelines (or pipeline sets) pauses for a limited number of clock cycles. The processor enters the limited serialized mode in response to detecting a "conflict-causing" instruction (an instruction, other than a branch instruction whose branch is taken, that could cause a conflict between resources shared by the pipelines during parallel processing mode operation). An example of a conflict-causing instruction is a conditional instruction requiring reading of a constant from a constant memory (for processing data in one pipeline) but reading of a different constant from the same memory (for processing data in another one of the pipelines) in the same cycle. In one implementation, upon detecting a conflict-causing instruction when operating in a parallel processing mode, the processor enters a limited serialized mode in which one data value (to be processed in accordance with the conflict-causing instruction) is launched into a first one of the pipelines while operation of a second pipeline pauses (e.g., for one clock cycle), then operation of the first pipeline pauses (e.g., for one clock cycle) while another data value is launched (with the conflict-causing instruction) into the second pipeline. During limited serialized mode operation, when the processor has N pipelines (where N is greater than or equal to three), operation of all pipelines (except a first pipeline) halts while a data value is launched (with the conflict-causing instruction) into the first pipeline, then operation of all pipelines (except a second pipeline) halts while another data value is launched (with the conflict-causing instruction) into the second pipeline, then operation of all pipelines (except a third pipeline) halts while another data value is launched (with the conflict-causing instruction) into the third pipeline, and so on until the conflict-causing instruction and N data values have been launched into all the pipelines, at which time operation in the parallel processing mode resumes. Preferably, the processor is also configured to recognize and resolve branch instructions to be executed (before processing of data in accordance with each branch instruction starts) during parallel processing mode operation, and to enter a fully serialized operating mode when it determines that a branch will be taken in at least one pipeline (and that the branch will not be taken to the same target in all the pipelines).

In another class of embodiments, the invention is a graphics processing system including a programmable pipelined vertex processor that implements any embodiment of the invention, a rasterizer that renders vertex data output from the vertex processor, and a pixel processor that performs texturing (and optionally other processing) operations on the rasterizer's output. Optionally, a frame buffer is coupled to the output of the pixel processor. Typically, at least the vertex processor, rasterizer, and pixel processor are implemented in a single chip. The multi-pipeline architecture of the vertex processor is area-efficient in the sense that it has a smaller footprint on the chip than would a processor with a greater number of parallel pipelines. The vertex processor is also capable of higher throughput rates (for executing typical programs) than a processor having fewer parallel pipelines, and is capable of executing branch instructions.

In other embodiments, the invention is a mode control unit (e.g., control unit 28 of FIG. 3) for use in any embodiment of the inventive graphic processor.

Other embodiments are methods for pipelined graphics data processing (in multiple pipelines) in a manner allowing parallel processing mode operation and also handling branching instructions and preventing conflicts among the pipelines. One such method is for pipelined processing of graphics data in accordance with a program, in at least one of a parallel processing mode and a serialized mode, said method including the steps of:
  (a) monitoring instructions of the program to identify each branch instruction of the program before commencing to execute the branch instruction;
  (b) while performing step (a), executing the program on parallel streams of the data in multiple processing pipelines in the parallel processing mode, at least until a branch instruction is identified in step (a); and
  (c) if a branch instruction is identified while performing steps (a) and (b), ceasing execution of the program in the parallel processing mode and completing execution of the program in the serialized mode, if necessary to prevent conflict between the pipelines due to branching.

Execution of the program in the parallel processing mode can includes the steps of launching the parallel streams of the data into at least two of the pipelines during one clock cycle and processing the streams of the data in parallel in said at least two of the pipelines in accordance with the program. Execution of the program in the serialized mode can includes the steps of launching the data into no more than one of said at least two of the pipelines during each clock cycle, and processing each data value launched into one of the pipelines only in said one of the pipelines while freezing operation of each other one of the pipelines.

Step (c) can include the step of ceasing execution of the program in the parallel processing mode and completing execution of the program in the serialized mode upon determining that a branch will be taken in at least one of the pipelines during execution of a branch instruction of the program but that the branch will not be taken to the same target in all of the pipelines.

A second embodiment of the inventive method is a method for pipelined processing of graphics data in accordance with a program, in at least one of a parallel processing mode and a limited serialized mode, said method including the steps of:
  (a) monitoring instructions of the program to identify each conflict-causing instruction of the program before commencing to execute the conflict-causing instruction;
  (b) while performing step (a), executing the program on parallel streams of the data in multiple processing pipelines in the parallel processing mode, at least until a conflict-causing instruction is identified in step (a); and
  (c) if a conflict-causing instruction is identified while performing steps (a) and (b), halting execution of the program in the parallel processing mode, and executing at least one instruction of the program, including the identified conflict-causing instruction, in the limited serialized mode, thereby preventing a conflict between the pipelines that would otherwise occur during execution of the identified conflict-causing instruction in the parallel processing mode.

In the second embodiment, execution of the program in the parallel processing mode can resume after step (c) while performance of step (a) continues. Execution of the program in the parallel processing mode can include the steps of launching the parallel streams of the data into at least two of the pipelines during one clock cycle, and processing the streams of the data in parallel in said at least two of the pipelines in accordance with the program. Execution of the program in the limited serialized mode can include the steps of pausing operation of a first one of the pipelines during execution of the identified conflict-causing instruction on data in a second one of the pipelines, and then pausing operation of the second one of the pipelines during execution of the identified conflict-causing instruction on data in the first one of the pipelines, so as to prevent occurrence of the conflict between the pipelines.

In the second embodiment, step (a) can includes the step of monitoring the instructions of the program to identify each branch instruction of the program before commencing to execute the branch instruction. If a branch instruction is identified in step (a), execution of the program on parallel streams of the data in the parallel processing mode in step (b) ceases and execution of the program is completed in a third mode (a fully serialized mode) if necessary to prevent conflict between the pipelines due to branching.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:

1. A programmable graphics processor operable in any one of a parallel processing mode and a serialized mode, said processor comprising;

at least two processing pipelines, wherein each of the pipelines is configured to process data in accordance with a program, including by executing branch instructions; and mode control circuitry coupled and configured to receive instructions for pipelined execution of the program, to assert the instructions to the pipelines, to monitor the instructions at least in the parallel processing mode to identify each branch instruction of the instructions before execution of the branch instruction in any of the pipelines, and to cause the processor to operate in the serialized mode when necessary to prevent any conflict between the pipelines due to branching, wherein in the parallel processing mode, data values are launched into N of the pipelines during one clock cycle, where $N \geq 2$, and the data values are processed in parallel in said N of the pipelines in accordance with the program with said N of the pipelines each executing identical instructions, and in the serialized mode, each data value launched into one of the pipelines is processed in said one of the pipelines while operation of each other one of the pipelines is frozen.

2. The processor of claim 1, wherein the mode control circuitry is configured to cause the processor to undergo a transition from operation in the parallel processing mode to operation in the serialized mode upon determining that a branch will be taken in at least one of the pipelines during execution of a branch instruction of the program but that the branch will not be taken to the same target in all of the pipelines.

3. The processor of claim 1, wherein the data values belong to multiple data threads, the processor in the parallel processing mode is configured to process data values of different ones of the data threads in parallel in different ones of said N of the pipelines in accordance with the program, and the processor in the serialized mode is configured to process data of one of the data threads in a first one of said N of the pipelines in accordance with instructions of the program commencing with a first one of the instructions, and then to process data of another one of the data threads in a second one of said N of the pipelines in accordance with instructions of the program commencing with the first one of the instructions.

4. The processor of claim 3, wherein N=3, the processor in the serialized mode is configured to process the first one of the data threads in the first one of said N of the pipelines in accordance with instructions of the program commencing with the first one of the instructions, then to process a second one of the data threads in the second one of said N of the pipelines in accordance with instructions of the program commencing with said first one of the instructions, then to process a third one of the data threads in a third one of said N of the pipelines in accordance with instructions of the program commencing at said first one of the instructions, and the processor is configured to undergo a transition from operation in the serialized mode to operation in the parallel processing mode upon completion of processing of the third one of the data threads in the third one of the pipelines.

5. The processor of claim 1, wherein the processor is operable in any one of the parallel processing mode, the serialized mode, and a third mode, and the mode control circuitry is configured to monitor the instructions, at least in the parallel processing mode, to identify a conflict-causing instruction before execution of the conflict-causing instruction in any of the pipelines, and to cause the processor to commence operation in the third mode to prevent a conflict between the pipelines that would occur during execution of the conflict-causing instruction in the parallel processing mode, wherein said conflict-causing instruction is not a branch instruction.

6. The processor of claim 5, wherein during operation in the third mode, operation of a first one of the pipelines pauses during execution of the conflict-causing instruction on data in a second one of the pipelines, and then operation of the second one of the pipelines pauses during execution of the conflict-causing instruction on data in the first one of the pipelines.

7. The processor of claim 5, wherein during operation in the third mode, operation of a first one of the pipelines pauses for one clock cycle during execution of the conflict-causing instruction on data in a second one of the pipelines, and then operation of the second one of the pipelines pauses for one clock cycle during execution of the conflict-causing instruction on data in the first one of the pipelines.

8. The processor of claim 5, wherein the pipelines include at least a first pipeline, a second pipeline, and a third pipeline, and during operation in the third node, operation of all of the pipelines except the first pipeline pauses during execution of the conflict-causing instruction on data in the first pipeline and then operation of all of the pipelines except the second pipeline pauses during execution of the conflict-causing instruction on data in the second pipeline, and then operation of all of the pipelines except the third pipeline pauses during execution of the conflict-causing instruction on data in the third pipeline.

9. The processor of claim 5, wherein the processor includes at least one memory coupled for shared use by at least a first one of the pipelines and a second one of the pipelines, and wherein execution of the conflict-causing instruction in the parallel processing mode would require conflicting access to the memory by said first one of the pipelines and said second one of the pipelines.

10. The processor of claim 1, wherein said processor is a vertex processor, and the vertex processor also includes:
input buffers coupled to the processing pipelines for launching object space vertex data into said processing pipelines during each of the parallel processing mode and the serialized mode.

11. The processor of claim 1, wherein the mode control circuitry is configured such that no stalls occur in the pipelines during instruction execution.

12. A programmable graphics processor operable in any one of a parallel processing mode and a serialized mode, said processor comprising:
input buffers;
output buffers;
at least three processing pipelines connected between the input buffers and the output buffers, including a first pipeline, a second pipeline, and a third pipeline, wherein each of the pipelines is configured to process data in accordance with a program including by executing branch instructions; and
mode control circuitry coupled and configured to receive instructions for pipelined execution of the program, assert the instructions to the pipelines, monitor the instructions at least in the parallel processing mode to identify each branch instruction of the instructions before execution of the branch instruction in any of the pipelines, and cause the processor to operate in the serialized mode when necessary to prevent any conflict between the pipelines due to branching, wherein
in the parallel processing mode, data values launched from the input buffers into the first pipeline, the second pipeline, and the third pipeline during a clock cycle are processed in parallel in the first pipeline, the second pipeline, and the third pipeline in accordance with the program and by executing identical instructions, and in the serialized mode, each data value launched into one of the pipelines is processed in said one of the pipelines while operation of each other one of the pipelines is frozen.

13. The processor of claim 12, wherein the processor is a vertex processor, and object space vertex data are launched from the input buffers into the processing pipelines during each of the parallel processing mode and the serialized mode.

14. The processor of claim 13, also including:

an input interface unit including a vertex attribute buffer coupled and configure to load the object space vertex data into the input buffers, wherein the input interface unit also includes an instruction memory coupled and configured to assert the instructions to the mode control circuitry.

15. The processor of claim 12, wherein the data values belong to multiple data threads, and the processor in the parallel processing mode is configured to launch data values belonging to a first three of the data threads from a first three of the input buffers into the first pipeline, the second pipeline, and the third pipeline in a first clock cycle, to launch data values belonging to a second three of the data threads from the input buffers into the first pipeline, the second pipeline, and the third pipeline in a second clock cycle, and to launch data values belonging to a third three of the threads from the input buffers into the first pipeline, the second pipeline, and the third pipeline in third clock cycle.

16. The processor of claim 12, wherein the mode control circuitry is configured to cause the processor to undergo a transition from operation in the parallel processing mode to operation in the serialized mode upon determining that a branch will be taken in at least one of the pipelines during execution of a branch instruction of the program but that the branch will not be taken to the same target in all of the pipelines.

17. A graphics processing system, including:

a programmable vertex processor operable in any one of a parallel processing mode and a serialized mode to generate vertex data;

a rasterizer coupled to receive the vertex data from the vertex processor and configured to generate rendered data in response to the vertex data; and a pixel processor coupled to receive the rendered data from the rasterizer and configured to perform at least one of a texturing operation and a color changing operation on the rendered data, wherein the vertex processor includes:

at least two processing pipelines, wherein each of the pipelines is configured to process data in accordance with a program, including by executing branch instructions; and mode control circuitry coupled and configured to receive instructions for pipelined execution of the program, to assert the instructions to the pipelines, to monitor the instructions at least in the parallel processing mode to identify each branch instruction of the instructions before execution of the branch instruction in any of the pipelines, and to cause the vertex processor to operate in the serialized mode when necessary to prevent any conflict between the pipelines due to branching, wherein in the parallel processing mode, data values are launched into N of the pipelines during one clock cycle, where $N \geq 2$, and the data values are processed in parallel in said N of the pipelines in accordance with the program with said N of the pipelines each executing identical instructions, and in the serialized mode, each data value launched into one of the pipelines is processed in said one of the pipelines while operation of each other one of the pipelines is frozen.

18. The system of claim 17, wherein the mode control circuitry is configured to cause the vertex processor to undergo a transition from operation in the parallel processing mode to operation in the serialized mode upon determining that a branch will be taken in at least one of the pipelines during execution of a branch instruction of the program but that the branch will not be taken to the same target in all of the pipelines.

19. The system of claim 17, wherein the data values belong to multiple data threads, the vertex processor in the parallel processing mode is configured to process data values of different ones of the data threads in parallel in different ones of said N of the pipelines in accordance with the program, and the vertex processor in the serialized mode is configured to process data of one of the data threads in a first one of said N of the pipelines in accordance with instructions of the program commencing with a first one of the instructions, and then to process data of another one of the data treads in a second one of said N of the pipelines in accordance with instructions of the program commencing with the first one of the instructions.

20. The system of claim 19, wherein N=3, the vertex processor in the serialized mode is configured to process the first one of the data threads in the first one of said N of the pipelines in accordance with instructions of the program commencing with the first one of the instructions, then to process a second one of the data threads in the second one of said N of the pipelines in accordance with instructions of the program commencing with said first one of the instructions, then to process a third one of the data threads in a third one of said N of the pipelines in accordance with instructions of the program commencing at said first one of the instructions, and the vertex processor is configured to undergo a transition from operation in the serialized mode to operation in the parallel processing mode upon completion of processing of the third one of the data threads in the third one of the pipelines.

21. The system of claim 17, wherein the vertex processor is operable in any one of the parallel processing mode, the serialized mode, and a third mode, and the mode control circuitry is configured to monitor the instructions, at least in the parallel processing mode, to identify a conflict-causing instruction before execution of the conflict-causing instruction in any of the pipelines, and to cause the vertex processor to commence operation in the third mode to prevent a conflict between the pipelines that would occur during execution of the conflict causing instruction in the parallel processing mode, wherein said conflict-causing instruction is not a branch instruction.

22. The system of claim 21, wherein during operation of the vertex processor in the third mode, operation of a first one of the pipelines pauses during execution of be conflict-causing instruction on data in a second one of the pipelines, and then operation of the second one of the pipelines pauses during execution of the conflict-causing instruction on data in the first one of the pipelines.

23. The system of claim 22, wherein during operation of the vertex processor in the third mode, operation of a first one of the pipelines pauses for one clock cycle during execution of the conflict-causing instruction on data in a second one of the pipelines, and then operation of the second one of the pipelines pauses for one clock cycle during execution of the conflict-causing instruction on data in the first one of the pipelines.

24. The system of claim 22, wherein the pipelines include at least a first pipeline, a second pipeline, and a third pipeline, and during operation of the vertex processor in the third mode, operation of all of the pipelines except the first pipeline pauses during execution of the conflict-causing instruction on data in the first pipeline, and then operation of all of the pipelines except the second pipeline pauses during execution of the conflict-causing instruction on data in the second pipeline, and then operation of all of the pipelines except the third pipeline pauses during execution of the conflict-causing instruction on data in the third pipeline.

25. A programmable graphics processor operable in any one of a parallel processing mode and a serialized mode, said processor comprising:
    at least two processing pipelines, wherein each of the pipelines is configured to process data in accordance with a program; and
    mode control circuitry coupled and configured to receive instructions for pipelined execution of the program, to assert the instructions to the pipelines, to monitor the instructions at least in the parallel processing mode to identify a conflict-causing instruction before execution of the conflict-causing instruction in any of the pipelines, and to cause the processor to commence operation in the serialized mode to prevent a conflict between the pipelines that would occur during execution of the conflict-causing instruction in the parallel processing mode.

26. The processor of claim 25, wherein the mode control circuitry is configured to assert the instructions to the pipelines such that the pipelines receive identical instructions during at least the parallel processing mode.

27. The processor of claim 26, wherein
    the processor in the parallel processing mode is configured to launch data values into N of the pipelines during one clock cycle, where $N \geq 2$, and to process the data values in parallel in said N of the pipelines in accordance with the program, and
    during operation in the serialized mode, operation of a first one of the pipelines pauses during execution of the conflict-causing instruction on data in a second one of the pipelines, and then operation of the second one of the pipelines pauses during execution of the conflict-causing instruction on data in the first one of the pipelines, so as to prevent occurrence of the conflict between the pipelines.

28. The processor of claim 27, wherein during operation in the serialized mode, operation of the first one of the pipelines pauses for one clock cycle during execution of the conflict-causing instruction on data in the second one of the pipelines, and then operation of the second one of the pipelines pauses for one clock cycle during execution of the conflict-causing instruction on data in the first one of the pipelines, so as to prevent occurrence of the conflict between the pipelines.

29. The processor of claim 26, wherein the pipelines include at least a first pipeline, a second pipeline, and a third pipeline,
    the processor in the parallel processing mode is configured to launch data values into the first pipeline, the second pipeline, and the third pipeline during one clock cycle, and to process the data values in parallel in the first pipeline, the second pipeline, and the third pipeline in accordance with the program, and
    during operation in the serialized mode, operation of all of the pipelines except the first pipeline pauses during execution of the conflict-causing instruction on data in the first pipeline, and then operation of all of the pipelines except the second pipeline pauses during execution of the conflict-causing instruction on data in the second pipeline, and then operation of all of the pipelines except the third pipeline pauses during execution of the conflict-causing instruction on data in the third pipeline, so as to prevent occurrence of the conflict between the pipelines.

30. The processor of claim 26, wherein the processor also includes:
    at least one memory coupled for shared use by at least a first one of the pipelines and a second one of the pipelines, and wherein execution of the conflict-causing instruction in the parallel processing mode would require conflicting access to the memory by said first one of the pipelines and said second one of the pipelines.

31. The processor of claim 26, wherein the conflict-causing instruction is not a branch instruction, the processor is operable in any one of the parallel processing mode, the serialized mode, and a third mode, and the mode control circuitry is configured to monitor the instructions, at least in the parallel processing mode, to identify each branch instruction of the instructions before execution of the branch instruction in any of the pipelines, and cause the processor to operate in the third mode when necessary to prevent any conflict between the pipelines due to branching.

32. The processor of claim 31, wherein
    the processor in the parallel processing mode is configured to launch data values are launched into N of the pipelines during one clock cycle, where $N \geq 2$, and to process the data values in parallel in said N of the pipelines in accordance with the program, and
    the processor in the third mode is configured to process each data value launched into one of the pipelines in accordance with the program, including by executing a branch instruction, and to process said each data value in said one of the pipelines while operation of each other one of the pipelines is frozen.

33. The processor of claim 31, wherein the mode control circuitry is configured to cause the processor to undergo a transition from operation in the parallel processing mode to operation in the third mode upon determining that a branch will be taken in at least one of the pipelines during execution of a branch instruction of the program but that the branch will not be taken to the same target in all of the pipelines.

34. The processor of claim 31, wherein the data values belong to multiple data threads,
    the processor in the parallel processing mode is configured to launch data values into N of the pipelines during one clock cycle, where $N \geq 2$, and to process data values of different ones of the data threads in parallel in different ones of said N of the pipelines in accordance with the program, and
    the processor in the third mode is configured to process data of one of the data threads in a first one of said N of the pipelines in accordance with instructions of the program commencing with a first one of the instructions, and then to process data of another one of the data threads in a second one of said N of the pipelines in accordance with instructions of the program commencing with the first one of the instructions.

35. The processor of claim 26, wherein said processor is a vertex processor, and the vertex processor also includes:
input buffers coupled to the processing pipelines for launching object space vertex data into said processing pipelines during each of the parallel processing mode and the serialized mode.

36. The processor of claim 35, also including:
instruction fetching circuitry; and
an input interface unit coupled and configure to load data into the input buffers, and to provide mode bits to the instruction fetching circuitry, wherein the instruction fetching unit is configured to assert the instructions to the mode control circuitry in response to the mode bits.

37. A graphics processing system, including;
a programmable vertex processor operable in any one of a parallel processing mode and a serialized mode to generate vertex data;
a rasterizer coupled to receive the vertex data from the vertex processor and configured to generate rendered data in response to the vertex data; and
a pixel processor coupled to receive the rendered data from the rasterizer and configured to perform at least one of a texturing operation and a color changing operation on the rendered data,
wherein the vertex processor comprises:
at least two processing pipelines, wherein each of the pipelines is configured to process data in accordance with a program; and
mode control circuitry coupled and configured to receive instructions for pipelined execution of the program, to assert the instructions to the pipelines such that the pipelines receive identical instructions in at least the parallel processing mode, to monitor the instructions at least in the parallel processing mode to identify a conflict-causing instruction before execution of the conflict-causing instruction in any of the pipelines, and to cause the vertex processor to commence operation in the serialized mode to prevent a conflict between the pipelines that would occur during execution of the conflict-causing instruction in the parallel processing mode.

38. The system of claim 37, wherein the pipelines include at least a first pipeline, a second pipeline, and a third pipeline,
the vertex processor in the parallel processing mode is configured to launch data values into the first pipeline, the second pipeline, and the third pipeline during one clock cycle, and to process the data values in parallel in the first pipeline, the second pipeline, and the third pipeline in accordance with the program, and
during operation in the serialized mode, operation of all of the pipelines except the first pipeline pauses during execution of the conflict-causing instruction on data in the first pipeline, and then operation of all of the pipelines except the second pipeline pauses during execution of the conflict-causing instruction on data in the second pipeline, and then operation of all of the pipelines except the third pipeline pauses during execution of the conflict-causing instruction on data in the third pipeline.

39. The system of claim 38, wherein the vertex processor also includes:

at least one memory coupled for shared use by at least a first one of the pipelines and a second one of the pipelines, and wherein execution of the conflict-causing instruction in the parallel processing mode would require conflicting access to the memory by said first one of the pipelines and said second one of the pipelines.

40. The system of claim 38, wherein the conflict-causing instruction is not a branch instruction, the vertex processor is operable in any one of the parallel processing mode, the serialized mode, and a third mode, and the mode control circuitry is configured to monitor the instructions, at least in the parallel processing mode, to identify each branch instruction of the instructions before execution of the branch instruction in any of the pipelines, and cause the vertex processor to operate in the third mode when necessary to prevent any conflict between the pipelines due to branching.

41. A method for pipelined processing of graphics data in accordance with a program, in at least one of a parallel processing mode and a serialized mode, said method including the steps or:
(a) monitoring instructions of the program to identify each branch instruction of the program before commencing to execute the branch instruction;
(b) while performing step (a), executing the program on parallel streams of the data in multiple processing pipelines in the parallel processing mode in single-instruction-multiple-data fashion, at least until a branch instruction is identified in step (a); and
(c) if a branch instruction is identified while performing steps (a) and (b), ceasing execution of the program in the parallel processing mode and completing execution of the program in the serialized mode, if necessary to prevent conflict between the pipelines due to branching.

42. The method of claim 41, wherein execution of the program in the parallel processing mode includes the steps of:
launching the parallel streams of the data into at least two of the pipelines during one clock cycle; and
processing the streams of the data in parallel in said at least two of the pipelines in accordance with the program, and
wherein execution of the program in the serialized mode includes the steps of:
launching the data into no more than one of said at least two of the pipelines during each clock cycle; and
processing each data value launched into one of the pipelines only in said one of the pipelines while freezing operation of each other one of the pipelines.

43. The method of claim 41, wherein step (c) includes the step of ceasing execution of the program in the parallel processing mode and completing execution of the program in the serialized mode upon determining that a branch will be taken in at least one of the pipelines during execution of a branch instruction of the program but that the branch will not be taken to the same target in all of the pipelines.

44. A method for pipelined processing of graphics data in accordance with a program in at least one of a parallel processing mode and a serialized mode, said method including the steps of:
(a) monitoring instructions of the program to identify each conflict-causing instruction of the program before commencing to execute the conflict-causing instruction;
(b) while performing step (a), executing the program on parallel streams of the data in multiple processing pipelines in the parallel processing mode, at least until a conflict-causing instruction is identified in step (a); and (c) if a conflict-causing instruction is identified while performing steps (a) and (b), halting execution of the program in the parallel processing mode, and executing at least one instruction of the program including the identified conflict-causing instruction in the serialized mode, thereby preventing a conflict between the pipelines that would otherwise occur during execution of the identified conflict-causing instruction in the parallel processing mode.

45. The method of claim 44, also including the step of:
(d) after step (c), resuming execution of the program in the parallel processing mode while continuing to perform step (a).

46. The method of claim 44, wherein execution of the program in the parallel processing mode includes the steps of:

launching the parallel streams of the data into at least two of the pipelines during one clock cycle; and processing the streams of the data in parallel in said at least two of the pipelines in accordance with the program, aid wherein execution of the program in the serialized mode includes the steps of:

pausing operation of a first one of the pipelines during execution of the identified conflict-causing instruction on data in a second one of the pipelines, and then pausing operation of the second one of the pipelines during execution of the identified conflict-causing instruction on data in the first one of the pipelines, so as to prevent occurrence of the conflict between the pipelines.

47. The method of claim 46, wherein step (a) includes the step of monitoring the instructions of the program to identify each branch instruction of the program before commencing to execute the branch instruction, and if a branch instruction is identified in step (a), ceasing execution of the program on parallel streams of the data in the parallel processing mode in step (b) and completing execution of the program in a third mode if necessary to prevent conflict between the pipelines due to branching, and wherein execution of the program in the third mode includes the steps of:

launching the data into no more than one of said at least two of the pipelines during each clock cycle; and processing each data value launched into one of the pipelines only in said one of the pipelines while freezing operation of each other one of the pipelines.

* * * * *

UNITED STATES PATENT AND TRADEMARK OFFICE
CERTIFICATE OF CORRECTION

PATENT NO.    : 6,947,047 B1
DATED         : September 20, 2005
INVENTOR(S)   : Moy et al.

It is certified that error appears in the above-identified patent and that said Letters Patent is hereby corrected as shown below:

Column 33,
Line 16, replace "configure" with -- configured --.

Column 34,
Line 58, replace "conflict causing" with -- conflict-causing --.

Column 37,
Line 13, replace "configure" with -- configured --.

Signed and Sealed this

Third Day of January, 2006

JON W. DUDAS
*Director of the United States Patent and Trademark Office*